United States Patent
De Hoogh et al.

(10) Patent No.: US 12,052,348 B2
(45) Date of Patent: Jul. 30, 2024

(54) COMPUTATION DEVICE USING SHARED SHARES

(71) Applicant: KONINKLIJKE PHILIPS N.V., Eindhoven (NL)

(72) Inventors: Sebastiaan Jacobus Antonius De Hoogh, Oosterhout (NL); Ronald Rietman, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 363 days.

(21) Appl. No.: 17/299,972

(22) PCT Filed: Dec. 3, 2019

(86) PCT No.: PCT/EP2019/083390
§ 371 (c)(1),
(2) Date: Jun. 4, 2021

(87) PCT Pub. No.: WO2020/114999
PCT Pub. Date: Jun. 11, 2020

(65) Prior Publication Data
US 2021/0367766 A1 Nov. 25, 2021

(30) Foreign Application Priority Data

Dec. 7, 2018 (EP) ...................... 18211183

(51) Int. Cl.
*H04L 9/08* (2006.01)
*H04L 9/06* (2006.01)

(52) U.S. Cl.
CPC ............ *H04L 9/085* (2013.01); *H04L 9/0618* (2013.01); *H04L 9/0894* (2013.01); *H04L 2209/125* (2013.01); *H04L 2209/16* (2013.01)

(58) Field of Classification Search
CPC ........ G06Q 50/01; G06Q 30/06; G06Q 10/10; G06Q 20/12; G06Q 20/20; G06Q 20/363;
(Continued)

(56) References Cited

U.S. PATENT DOCUMENTS 10,790,962 B2 * 9/2020 Rietman ............... H04L 9/0631
10,841,077 B2 * 11/2020 Rietman ................. H01L 23/66
(Continued)

FOREIGN PATENT DOCUMENTS

WO 2017063986 A1 4/2017

OTHER PUBLICATIONS

Alex Biryukov et al "Attacks and Countermeasures for White-Box Designs" IACR, vol. 20181107 Nov. 7, 2018 pp. 1-30.
(Continued)

*Primary Examiner* — Sharif E Ullah

(57) ABSTRACT

Some embodiments are directed to a computation device for performing a computation on at least a set of values. The values are stored in memory as a plurality of shares that define the value. An operation of the computation may be performed on a set of input values to obtain an output value. The output value may be defined by at least one shared share and at least one computed share. The at least one shared share may also define a further value, e.g., an output of a previously performed computation or an output of a further operation performed in parallel with the operation. The at least one computed share is computed from the at least one shared share and shares of the set of input values. A fault in the shared share affects the further value but a fault in the computed share, complicating share reduction attacks.

19 Claims, 8 Drawing Sheets

(58) Field of Classification Search
CPC .. G06Q 20/381; G06Q 30/02; G06Q 30/0207;
G06Q 30/0241; G06Q 20/065; H04L
67/306; H04L 51/32; H04L 67/22; H04L
67/02; H04L 67/10; H04L 51/38; H04L
65/403; H04L 51/046; H04L 65/1069;
H04L 9/085; H04L 9/0618; H04W 4/21;
H04W 4/029; H04W 4/023; H04W 4/185;
H04W 4/16; H04W 52/0261; H04W
12/06; H04W 4/24; H04W 4/50; G06F
16/9535; G06F 16/9024; G06F 16/23;
G06F 16/51; G06F 16/5838; G06F 1/163;
G06F 21/31; G06F 3/011
USPC ........ 713/168, 150, 163, 181; 726/2, 21, 36;
380/255, 264, 276
See application file for complete search history.

(56) References Cited

U.S. PATENT DOCUMENTS

| 2010/0174993 | A1* | 7/2010 | Pennington | G06F 16/44 715/810 |
| 2011/0202430 | A1* | 8/2011 | Narayanan | G06Q 30/0641 709/204 |
| 2012/0136936 | A1* | 5/2012 | Quintuna | G06F 21/6245 709/204 |
| 2013/0145028 | A1* | 6/2013 | Shalabi | H04L 63/101 709/225 |
| 2020/0177365 | A1* | 6/2020 | De Hoogh | G06F 17/141 |

OTHER PUBLICATIONS

Joppe W. Bos et al "Differential Computation Analysis: Hiding Your White-Box Designs is Not Enough" Cryptographic Hardware and Embedded Systems, Jan. 1, 2016 Section 6.

Louis Goubin, Pascal Paillier, Matthieu Rivain, Junwei Wang.: How to Reveal the Secrets of an Obscure White-Box Implementation, https://eprint.iacr.org/2018/098.pdf, 2018.

Yuval Ishai, Amit Sahai, David Wagner. "Private Circuits: Securing Hardware against Probing Attacks" iacr.org 2003.

International Search Report and Written Opinion from PCT/EP2019/083390 mailed Jun. 11, 2020.

* cited by examiner

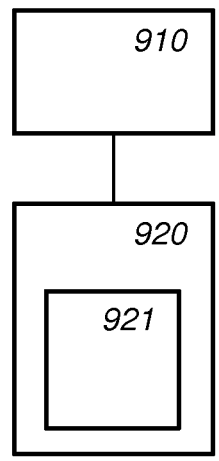
*Fig. 8a*
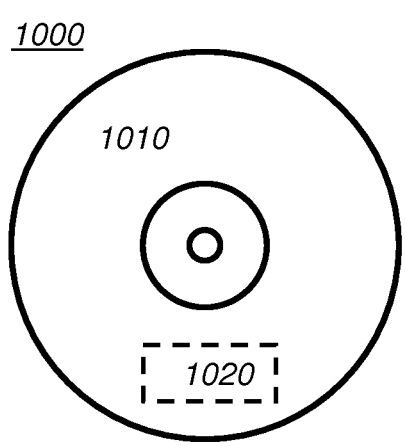
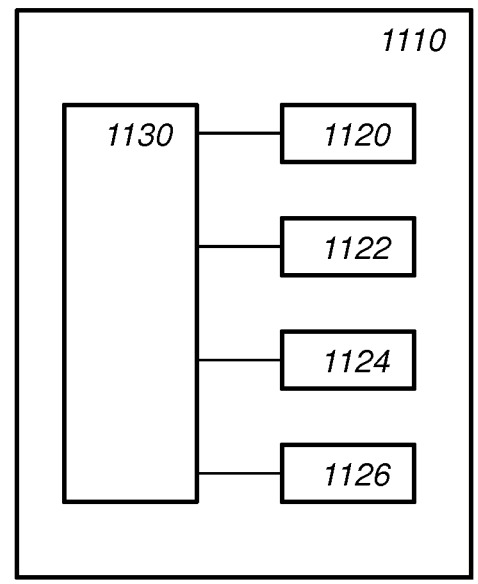
*Fig. 8b*  *Fig. 8c*

COMPUTATION DEVICE USING SHARED SHARES

CROSS-REFERENCE TO PRIOR APPLICATIONS

This application is the U.S. National Phase application under 35 U.S.C. § 371 of International Application No. PCT/EP2019/083390, filed on Dec. 3, 2019, which claims the benefit of EP Patent Application No. EP 18211183.1, filed on Dec. 7, 2018. These applications are hereby incorporated by reference herein.

FIELD OF THE INVENTION

The invention relates to a computation device, a computation method, and a computer readable medium.

BACKGROUND OF THE INVENTION

Computations involving sensitive data, such as cryptographic operations, may be attacked by attackers of various kinds. For instance, a cryptographic primitive is called secure in the black-box model, if an attacker who only has knowledge of the inputs and outputs of the primitive cannot elevate his rights, e.g., obtain secret keys, encrypt messages, decrypt messages, etcetera. For other types of computations involving sensitive information, for instance, in areas such as modelling, machine-learning, statistics, and the like, it is also relevant that an attacker cannot obtain the sensitive information used in the computation.

However, in practice attackers often do not operate in the black-box model, and in fact have more information than just the inputs and outputs. For example, in the grey-box model, it is assumed that an attacker has access to some information related to the execution of the computation. These additional sources of information are called 'side-channels'. For example, side-channels include the amount of time that an operation took, or the amount of power that was consumed, etc. In an even stronger model, the so-called white-box model, and attacker has full access to all internal values of the computation. Attackers may also modify values, even as the program is running. Even so, the white-box implementation aims to prevent the extraction of sensitive values from the computation.

In known white-box implementations, e.g., as described in European patent application EP 3363142 A1, sensitive values may be represented by multiple shares. The use of shares may improve protection against various types of side channel attacks, since any information that an attacker is able to deduce about one or a few shares of a sensitive value does not contain information about the sensitive value being stored. In effect, the use of shares allows to introduce a lot of entropy in the implementation, while keeping variables small to ensure that the implementation remains acceptable in terms of runtime and code-size. Unfortunately, such implementations may be susceptible to various kinds of share reduction and/or share localization attacks in which an attacker is able to reduce the number of shares, destroying entropy introduced by the shares and thereby reducing the protection offered by the introduction of the shares.

There is therefore a need to provide devices for computing on shares of values that provide better protection against share reduction and/or share localization attacks.

SUMMARY OF THE INVENTION

In order to better address one or more of the above concerns, computation devices are proposed as defined by the claims. A computation device performs a computation on at least a set of values. Each value of the set of values may be stored in memory as a plurality of shares that define the value.

According to a first aspect, an operation of the computation may be performed on a set of input values to obtain an output value. The output value may be defined by at least one shared share and at least one computed share. The at least one shared share may also define a further value. The at least one computed share may be computed from the at least one shared share and shares of the set of input values.

Since the at least one shared share also defines the further value but the at least one computed share does not, introducing a fault in the at least one shared share generally affects the computation in a different way than introducing a fault in the at least one computed share. For instance, a fault in the shared share may affect future operations using the further value, which a fault in the computed share does not. Hence, it is made more difficult for an attacker to determine that the at least one shared share and the at least one computed share are both shares of the output value. This complicates various attacks, e.g., share reduction or share localization attacks may become more difficult.

In an embodiment, the computation may comprise an evaluation of a cryptographic function such as a block cipher. For instance, a cryptographic key used by the cryptographic function may be hardcoded into the computation, the use of shared shares making it more difficult to extract this key.

In an embodiment, the input values and output values may not be computed as an intermediate result of performing the operation. This may further complicate attacks since, e.g., share reduction or share localization attacks can also not be mounted on the intermediate results of the operation.

In an embodiment, computing the at least one computed share may comprise computing a sequence of multiple intermediate results, each intermediate result being computed from the at least one shared share. This way, intermediate results of performing the operation include contributions from the at least one shared share. This may ensure that intermediate results of computing the at least one computed share are as independent of the input values as possible.

In an embodiment, the further value may be independent, e.g., uncorrelated, from the input values. Since introducing a fault in the at least one share may affect the further value, choosing a further value that is independent from the input values may increase the unpredictability of the effect of the fault. E.g., the fault occurs in a different part of the computation. This may make attacks more difficult.

In an embodiment, each share defining the output value also defines a further value. This may have as an advantage that the likelihood of ineffective faults in shares of the output value is decreased. For instance, a fault in the output value may not always affect the overall output of the computation, but each fault in a share of the output value may also lead to a fault in the further value, making it more likely that the overall output of the computation is affected. Hence, statistical ineffective fault analysis-type attacks are made more difficult.

In an embodiment, the further value is an output of a previous operation of the computation performed previously to the operation. This allows to re-use a share of the further value as a shared share without it needing to be recomputed.

In an embodiment, the computation may comprise a further operation on a further set of input values to obtain a further value. The further value may be defined, like the output value, by the at least one shared share, and additionally by at least one further computed share. The processor may compute the at least one computed share from the at least one shared share and shares of the set of input values. The processor may compute the at least one further computed share from the at least one shared share and shares of the further set of input values. This allows to obtain a shared share with relatively little overhead by performing two operations at the same time.

In an embodiment, the processor may be further configured to compute the at least one shared share using at least one share of an output of a previously performed operation as a random value. This may guarantee that the at least one shared share looks sufficiently random to an attacker without the need for an external randomness source.

In an embodiment, the operation and the further operation may be the same operation. This may make the operation and the further operation look more similar to an attacker.

In an embodiment, the computation may comprise a first and a second parallel computation branch. Each computation branch may compute a copy of the same output. An averaging computation may combine these multiple copies of the same output into a single output. The operation and the further operation may be comprised in different parallel computation branches. Such parallel computation branches may protect against various attacks, and may be combined in this way with relatively little overhead.

In an embodiment, the first parallel computation branch may comprise an obfuscation computation, followed by an inverse of the obfuscation computation, followed by a functional computation, followed by a dummy computation, and the second parallel computation branch comprises a dummy computation, followed by the functional computation, followed by an obfuscation computation, followed by an inverse of the obfuscation computation. This may cause computations at the same depth in circuits for the respective parallel computation branches to compute on different inputs, thereby increasing the unpredictability of introducing faults in respective shares.

In an embodiment, each parallel computation branch may further comprise a further obfuscation computation following the functional computation. The computation may further comprise an inverse of the further obfuscation computation following the averaging computation. This may further complicate attacks by making sure the averaging computation is performed on data that looks independent from the computation output.

In an embodiment, the computation may further comprise an initial obfuscation computation followed by an inverse of the initial obfuscation computation. These initial computations may provide shares that can be used as shared shares for subsequent operations and/or to compute shared shares from, without affecting the computation result.

In an embodiment, the values may be bits and the computation may comprise a binary circuit. Binary circuits may be particularly suitable for performing various computations, e.g., block cipher computations.

In an embodiment, further operations, e.g., of the computation, using the output value as an input are interleaved. This complicates attacks wherein an attacker introduces a fault in a share of the output value before one operation using the output value but after another operation using the output value. Such attacks might otherwise weaken the share reduction/share localization protection provided.

In an embodiment, a share of the plurality of shares may be stored encoded, making it harder to derive sensitive data from memory contents. In an embodiment, multiple values of the set of values may make up a combined value, the combined value being stored encoded. By applying encodings on a different granularity than shares, attacks focusing on a single granularity become more difficult.

According to a further aspect, the processor of this computation device is configured to re-share a first value and a second value. To this end, the processor may compute at least one new shared share defining both the first value and the second value based on previous shares defining the first value and previous shares defining the second value. The processor may further compute at least one further new share defining the first value from the at least one new shared share and the previous shares defining the first value. The processor may also compute at least one further new share defining the second value from the at least one new shared share and the previous shares defining the second value. This way, new shares for the first and second values may be obtained that are independent from the previous shares. This may make it harder for an attacker to trace values through the computation. It may also enable to perform a computation in which some operations are performed pairwise with a further operation and some other operations are not using the various techniques described herein.

A further aspect concerns a computation device configured to re-share a value. The value may be defined after the re-sharing by at least one shared share and at least one computed share. The at least one shared share may also define an output of an operation of the computation performed before the re-sharing. The re-sharing may comprise computing the at least one computed share from the at least one shared share and shares defining the value before the re-sharing. This provides another way to obtain new shares for the value that are independent from the shares before the re-sharing. Moreover, it helps to combine, in a single computation, operations that are performed together with a further operation and operations that are not.

A further aspect concerns a computation method. A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a computation device, FIG. 2 schematically shows an example of an embodiment of a computation device, FIG. 3a schematically shows an example of an embodiment of a computation device, FIG. 3b schematically shows an example of an embodiment of a computation device, FIG. 4 schematically shows an example of an embodiment of a computation device, FIG. 5 schematically shows an example of an embodiment of a computation device, FIG. 6 schematically shows an example of an embodiment of a computation device, FIG. 7a schematically shows an example of an embodiment of a computation device, FIG. 7b schematically shows an example of an embodiment of a computation device, FIG. 8a schematically shows an example of an embodiment of a computation method, FIG. 8b schematically shows a computer readable medium having a writable part comprising a computer program according to an embodiment, FIG. 8c schematically shows a representation of a processor system according to an embodiment.

LIST OF REFERENCE NUMERALS

Figure 1:
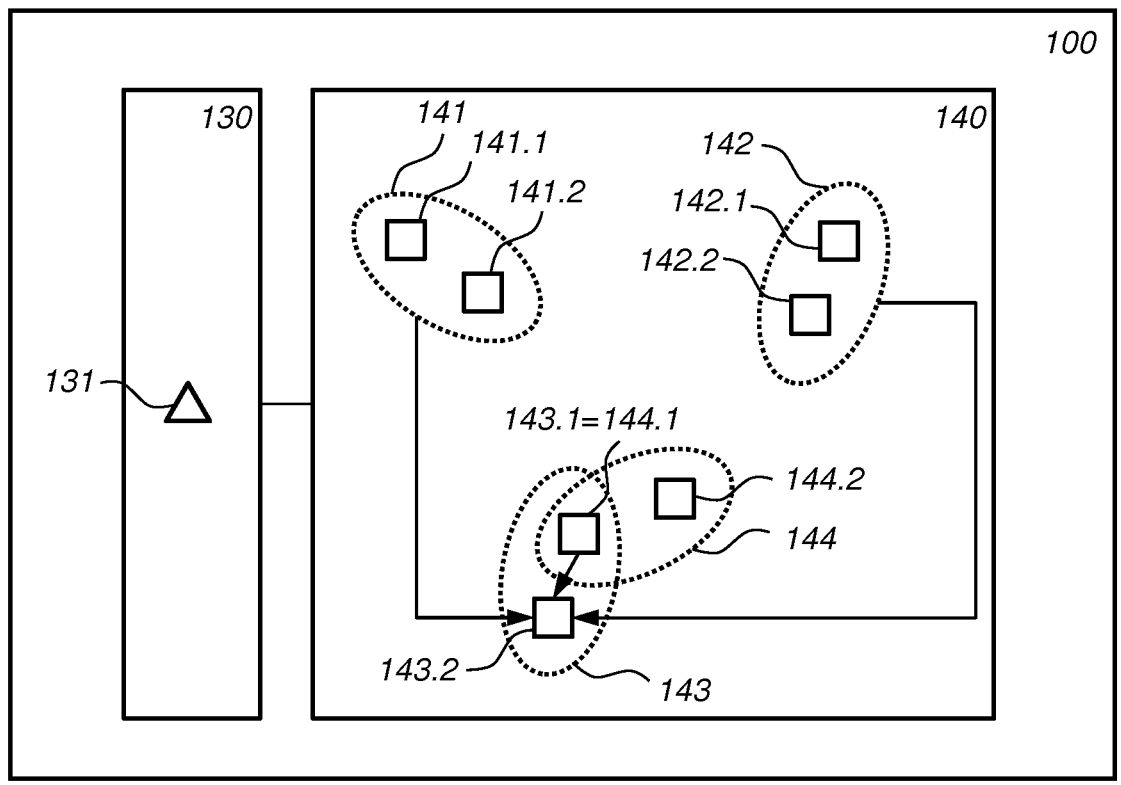

- 100 a computation device
- 130 a processor
- 131 an operation unit
- 140 a memory
- 141, 142 an input value
- 143 an output value
- 144 a further value
- 141.1, 141.2, 142.1, 142.2, 144.2 a share
- 143.1 a computed share
- 143.1=144.1 a shared share
- 200 a computation device
- 230 a processor
- 231 an operation unit
- 240 a memory
- 241, 243 an input value from the set of input values
- 242, 244 an input value from the further set of input values
- 245 an output value
- 246 a further value
- 241.2, 242.2, 243.2, 244.2, 245.2, 246.2 a share
- 241.1=242.1, 243.1=244.1, 245.1=246.1 a shared share
- 300, 300' a computation device
- 330, 330' a processor
- 340, 340' a memory
- 331, 332 a parallel computation branch unit
- 333, 338, 339 an operation unit
- 335 an averaging computation unit
- 336 an obfuscation computation unit
- 337 an inverse obfuscation computation unit
- 343 an output value
- 343.1 a shared share
- 400 a computation device
- 430 a processor
- 431 a first parallel computation branch unit
- 432 a second parallel computation branch unit
- 433 an operation unit
- 435 an averaging computation unit
- 451, 454, 458, 459 an obfuscation computation unit
- 452, 460, 461 an inverse obfuscation computation unit
- 453, 457 a functional computation unit
- 455, 456 a dummy computation unit
- 440 a memory
- 500 a computation device
- 530 a processor
- 531 an encoded operation unit
- 540 a memory
- 541 an input value
- 542 an output value
- 544 a further value
- 541.1, 541.2, 544.1 a share
- 542.1 a computed share
- 542.2=544.2 a shared share
- 600 a computation device
- 630 a processor
- 631 an encoded function unit
- 640 a memory
- 641, 644 a combined value
- 642, 643, 645, 646 a value making up a combined value
- 700 a computation device
- 730 a processor
- 731 a re-sharing unit
- 740 a memory
- 741 a first value
- 742 a second value
- 741.1, 741.1 a previous share defining the first value
- 742.1, 742.2 a previous share defining the second value
- 741.1'=742.1' a new shared share defining both the first value and the second value
- 741.2' a further new share defining the first value
- 742.2' a further new share defining the second value
- 800 a computation device
- 830 a processor
- 831 a re-sharing unit
- 840 a memory
- 841 a value
- 841.1, 841.2 a share defining the value before the re-sharing
- 841.1'=844.1 a shared share
- 841.2' a computed share
- 844 an output of an operation performed before the re-sharing
- 844.2 a share of the output
- 900 a computation method
- 910 providing a set of values
- 920 performing an operation
- 921 computing the at least one computed share
- 1000 a computer readable medium
- 1010 a writable part
- 1020 a computer program
- 1110 integrated circuit(s)
- 1120 a processing unit
- 1122 a memory
- 1124 a dedicated integrated circuit
- 1126 a communication element
- 1130 an interconnect
- 1140 a processor system

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

To introduce the invention, first, a number of attacks on white-box implementations are discussed. In various white-box implementations, sensitive variables are represented by multiple shares. For instance, a value x may be represented by n additive shares $(x_0, \ldots, x_{n-1})$, e.g., $\Sigma_{i=0}^{n} x_i = x$, but for any $S \subset \{0, n-1\}$, $\Sigma_{i \in S} x_i$ is random. Thus, information deduced from a subset of the shares of a value may contain no information about the value, whereas information over all shares may contain allow to derive the value. Generally, entropy, e.g., random values $x_0, \ldots, x_{n-1}$, helps to withstand side-channel attacks. At the same time, variables stored as shares may still be relatively small, such that the white-box implementation remains acceptable in terms of runtime and code-size.

Unfortunately, white-box implementations using shares may be vulnerable to share reduction attacks. In such an attack, an attacker reduces the number of shares, in effect destroying entropy introduced by the shares. Ultimately, an attacker may be able to reduce the number of shares of a value to one, eliminating the effect of the introduction of shares altogether. To mount a share reduction attack, an attacker typically aims to find locations of shares that correspond to the same value, e.g., to find two shares of the same value.

One possible attack on share representations is based on the following observation: If $\{z_i\}_i$ is a set of additive shares representing, or defining, a value z in a certain computation, then one may transform the represented value z into $z+\delta$ by changing any $z_i$ into $z_i+\delta$. Now if the result of the computation only depends on the represented values z, then the output of the computation may be the same for every fault $\delta$ introduced in $z_i$ that results into $z_i+\delta$. Now, suppose an attacker is given a computation comprising gates $C_0, \ldots, C_n$, where $z_i \leftarrow C_i(x_i)$ denotes the action where gate i evaluates to $z_i$ given input $x_i$. Then for all i=1, n the attacker may run the computation on a constant input and wait until gate i is evaluated. Then for any $\delta$ the attacker may change $z_i$ into $z_i+\delta$ and collect corresponding output $O_{i,\delta}$. The attacker may deduce that gate i and j operate on the same value if for any $\delta$ it holds that there is a $\delta'$ where $O_{i,\delta}=O_{j,\delta'}$. Note that $\delta$ may be different from $\delta'$, e.g., when shares are stored encoded.

Having found two or more shares that operate on the same value, an attacker may then reduce the shares. For example, if the shares are not encoded, the attacker may reduce the shares by adding them. If the shares are stored encoded, reducing the shares may be performed based on an additional analysis. For example, in such cases, it may be observed that for any $\Delta$ there exist a $\Delta'$ such that $$\mathrm{Enc}(z_j)+\Delta=\mathrm{Enc}(z_j+\delta), \text{ and}$$

$$\mathrm{Enc}(z_k)+\Delta'=\mathrm{Enc}(z_k-\delta).$$

so that the output remains the same. Such pairs may be equivalent with respect to the represented sum, e.g., define the same value. This set may be labelled as 0. This procedure may be repeated starting with a pair outside the just created set, e.g., until the all pairs have been labeled. Such an attack may be executed recursively, e.g., until every set of n shares has one label, e.g., of size a single share. During execution, an attacker may then replace an observed set of n corresponding shares into a label that can be viewed as a single encoding of the represented value z. This may enable use of attacks like Mutual Information Analysis (MIA) or Differential Computation Analysis (DCA) to extract sensitive information.

Various embodiments herein make it more difficult for an attacker to mount share reduction and/or share localization attacks. Still, the protection mechanisms described herein do not need to come at a high cost in terms of, for instance, the number of shares needed. For instance, in some embodiments, values are stored with fewer than five shares, e.g., three, four, or even just two. Moreover, in various embodiments, linear operations, e.g. addition or XOR gates, can be implemented as functions on individual shares. Security is further improved in various embodiments by allowing to perform multiplications, e.g., AND gates, with a re-randomization that further complicates statistical attacks.

A wide range of computations may be performed using the techniques described herein, e.g., computations specified by a binary or arithmetic circuit, or various iterative algorithms with invertible iterations.

In particular, embodiments of the invention allow to perform computations comprising the evaluation of a cryptographic primitive, such as a block cipher, e.g., the AES algorithm, with increased protection against share reduction/share localization attacks. Some of the examples below focus on the AES block cipher as described in Advanced Encryption Standard, Federal Information Processing Standards Publication 197, 2001. AES is an important, much-used, cryptographic primitive. However, it is stressed that techniques below can be applied to other cryptographic primitives as well. For example, other block ciphers may be implemented as embodiments. Especially block ciphers of SLT design (Substitution/Linear transformation block ciphers, sometimes referred to as Substitution-permutation network (SPN) block ciphers), such as AES (Rijndael), 3-Way, Kuznyechik, PRESENT, SAFER, SHARK, and Square, can be adapted with little effort. The cryptographic primitive may be a symmetric primitive, e.g., wherein an encrypting/decrypting key is the same, or a signing/verification key. The cryptographic primitive may also be keyless, such as a hash function. Protecting hash functions may be important, as they may be applied to secret data. In fact, hash functions may be part of a keyed design, such as if the hash function is used in HMAC.

One of the insights of the inventors that enable these improvements is the use of shared shares. Multiple values may be defined by the same shared share. For example, two values x and y may be stored in memory as shares $(s_0, s_1, s_2)=(r, x\ r, y\ r)$, where $x=s_0+s_1$ and $y=s_0+s_2$. Thus, $s_0$ is a shared share defining both x any y. Introducing a fault in $s_0$ may change both values x and y, while introducing a fault in $s_1$ (or respectively $s_2$) may change only the value x (respectively y). Hence, overall computation outputs obtained by faults in either one of the three shares may be different.

An operation of the computation may result in an output value that is defined by a shared share. Apart from being a share of the output value, the shared share may also be a share of a further value. For instance, consider a computation of which every value is represented by two shares, at some point in time, where $S=\{s_i\}_i$ is the collection of shares that has been introduced at that point in time. Then to compute output value z=f(x, y) on shares of input values x, y, a circuit may be created on input $x_0$, $x_i$ (both $\in \mathcal{S}$, the shares of x) and $y_0$, $y_1$, (both in $\mathcal{S}$, the shares of y) resulting in a computed share $z_0$, e.g., $z_0$=f(x, y)−$s_j$ of the output value. The other share of the output value may be defined implicitly as $z_1$=$s_j \in \mathcal{S}$. Here, $s_j$ may be an output of a previously performed operation, e.g., there exist $s_k \in \mathcal{S}$ so that $s_j$+$s_k$=v for some value v. After computing share z, we now have that $z_0$+$s_j$=z, so that $s_j$ is now a shared share defining both value z and value v. So, if an attacker introduces a fault at $s_j$ then both v and z may be affected, whereas introducing a fault at either $z_0$ or $s_k$ may only affect either z or u. However, other ways of obtaining shared shares are possible as well, e.g., two operations performed at the same time may result in a shared share defining outputs of the two operations. Various detailed embodiments incorporating the above insights are provided below.

Various additional attacks may be employed by an attacker that can actively interfere with the execution of the computation. One attack is so-called differential fault analysis (DFA). In some DFA attacks, an attacker induces a fault during the computation, and, from the change in output due to this fault, may be able to obtain information about the secret.

An additional type of attack that may be executed by an attacker that can actively interfere with the execution of the algorithm, is so-called statistical ineffective fault analysis (SIFA). SIFA focuses on ineffective faults, for example, faults that have no effect on the output of the computation for some inputs, but do affect the output for other inputs. An attacker may for example find input/output pairs for which the fault is ineffective. The fact that the fault is ineffective, may be used as an indicator that some internal variable in the circuit is not uniformly distributed for these particular inputs, whereas it is uniformly distributed if the inputs are uniformly distributed. When the non-uniformity occurs in an internal variable that is related to a relatively small part of the input or output, and a small part of the secret, this may be used to extract this part of the secret.

As a possible countermeasure against DFA, redundancy may be introduced in the computation. Introduction of faults that would change the output may be detected by observing a difference in the outputs of the redundant parts of the circuit. For example, the computation may be designed to give no output or a useless output. If a fault is ineffective, such countermeasures may not have any effect, thus may be insufficient to protect against a SIFA attack.

Generally, in order to protect against SIFA attacks, it is beneficial to reduce the number of ineffective faults, especially in sensitive parts of the computation. For example, the computations may be performed in such a way that, for at least some values of the computation, a single bit flip in any share of the value likely affects the output. Eliminating such single-bit ineffective faults may be particularly advantageous since they may be exploited relatively easily by an attacker. For instance, looking for an ineffective single bit flip in a part of a computation with N operations may take order-N time, which may be feasible if N is not too large. On the other hand, looking for an ineffective fault with multiple (say k>1) bit flips in this sane part of the circuit may take order $N^{Ak}$ and hence be more difficult.

The use of shared shares may help to reduce the number of ineffective faults and/or to make it harder to find them. For example, since a fault in a shared share defining multiple values may affect these multiple values, such a fault may not be ineffective since it always affects the output or at least it may be hard to detect that it is ineffective since there are fewer computation input values for which the output is not affected. In various embodiments, ineffective faults are made even more unlikely and/or harder to detect since each share defining an output value of an operation also defines a respective further value. In other words, such a value does not have a non-shared share that would be more likely to be ineffective than a shared share.

FIG. 1 schematically shows an example of an embodiment of a computation device 100. Computation device 100 comprises a processor 130 and a memory 140. Memory 140 may be used for data and/or instruction storage. For example, memory 140 may comprise software and/or data on which processor 130 is configured to act. Memory 140 may also store values 141-144. Processor 130 may be implemented as one or more processor circuits, e.g. microprocessors, ASICs, FPGA and the like. Memory 140 may comprise computer program instructions which are executable by processor 130. Processor 130, possibly together with memory 140, is configured according to an embodiment of a computation device.

Computation device 100 may be for performing a computation on at least a set of values. Values may be bits, bytes, field elements, ring elements, integers modulo a given modulus, e.g., a prime modulus, etcetera. The computation may for instance comprise a binary circuit being evaluated on bit values, for example, a binary circuit comprising AND and/or XOR operations. The computation may instead or in addition comprise an arithmetic circuit, for example, an arithmetic circuit comprising addition and/or multiplication operations. The computation typically comprises multiple operations, also called gates, e.g., performed according to various embodiments described herein. For instance, the computation may comprise at least 100 operations, at least 1000 operations, etc.

Various types of computations may be advantageously performed by computation device 100, e.g., cryptographic operations, statistical computations, data analytics computations, simulations of physical systems, etcetera. For instance, in various embodiments, the computation may comprise an evaluation of a cryptographic function, e.g., an evaluation of a block cipher on an input message using a symmetric key, a computation of a digital signature on an input message using a private signing key, or a decryption of an encrypted message using a private decryption key. The set of values may comprise various sensitive values. For instance, in the examples above, values making up the symmetric and private keys may be sensitive, and so may be intermediate values of the computations depending on them. In various types of computations, e.g., statistical/data analytics/simulation computations, some of the input data may be sensitive, e.g., it may be privacy-sensitive or commercially sensitive. Hence, it is advantageous to improve the protection of such data, e.g., against share reduction and/or share localization attacks.

Memory 140 may be configured to store set of values $\{z_i\}$. The computation may be performed at least on this set of values. Each value of the set of values may be stored as a plurality of shares $s_{i,j}$, e.g., secret-shares, that define the value. For example, shown in the figure are four values $z_1$ 141, $z_2$ 142, $z_3$ 143, and $z_4$ 144. For instance, value $z_1$ 141 may be stored as shares $s_{1,1}$ 141.1 and $s_{1,2}$ 141.2; value $z_2$ 142 may be stored as shares $s_{2,1}$ 142.1 and $s_{2,2}$ 142.2; value $z_3$ 143 may be stored as shares $s_{3,1}$ 143.1=144.1 and $s_{3,2}$ 143.2; and value $z_4$ 144 may be stored as shares $s_{4,1}$ 143.1=144.1 and $s_{4,2}$ 144.2. Both the number of values and the number of shares per value is illustrative, e.g., at least one value may be stored as more than two shares, e.g., three shares, four shares, five shares, or more. The number of values may be, e.g., at least 100 or at least 1000.

Throughout, we say that one or more shares define a value if the shares are comprised in the plurality of shares that the value is stored as. It will be understood that this is non-limiting, e.g., there may be additional shares in the plurality of shares and/or the share may define further values. Similarly, when we say that a value is "defined" by a share, and the like, it means that the share is comprised in the plurality of shares that the value is stored as, and there may be additional shares that the value is defined by and/or additional values that the share defines. Sometimes, to stress this aspect, we will say that a value is "at least in part defined" by a share, that a share "at least in part defines" a value, and the like.

A value $z_i$ stored as a plurality of shares $s_{i,j}$ may be defined by this plurality of shares by means of a reconstruction function that computes the value from the plurality of shares. Conversely, shares defining a value may be obtained from the unshared value using a sharing function, e.g., a secret-sharing function, that computes shares from the unshared value.

Various sharing and reconstruction methods are known and may be used here. For instance, a value $v_i$ and its shares $s_{i,1}, \ldots, s_{i,n}$ may be bits, the reconstruction function for the value being defined as the exclusive-or (XOR) $v_i = s_{i,1}$ xor ... xor $s_{i,n}$ of the shares. Another value $v_j$ and its shares $v_{j,1}, \ldots, v_{j,m}$ may be ring elements, the value $v_j$ being defined from its shares as the sum $v_j = v_{j,1} + \ldots + v_{j,m}$, of the shares. Various other types of shares, such as Shamir shares or replicated secret shares, may be used instead or in addition. Shares $s_{i,1}, \ldots, s_{i,n}$, may be obtained from unshared value $v_i$, e.g., by setting all but one shares independently from the unshared value, e.g., randomly or to a fixed value, and computing the remaining share therefrom, e.g., $s_{i,1} = v_i$ xor $S_{i,2}$ xor ... xor $s_{i,n}$.

Typically, a single share does not fix the value. In fact, a value defined in part by a share may be undefined given the share, e.g., all possibilities for the value may be equally likely. For instance, a value v defined from shares $s_1$ and $s_2$ as $v = s_1 + s_2$ may still take on any value V if $s_2$ is fixed by letting $s_1 = V - s_2$. In some cases, a value can even still take on any value even when fixing all of its shares except one, e.g., $v = s_1 + \ldots + s_7$ can still take on any value V if $s_2, \ldots, s_7$ are fixed by letting $s_1 = V s_2 - \ldots - s_7$. As a consequence, storing a value as shares may already provide some degree of protection since a value cannot be determined from subsets of shares.

Interestingly, a shared share 143.1=144.1 stored in memory 140 may in part define multiple values, e.g., a first value 143 may be stored as a first plurality of shares, e.g., shares 143.1=144.1 and 143.2, and a second value 144 may be stored as a second plurality of shares, e.g., shares 143.1=144.1 and 144.2. At least one shared share, e.g., share 143.1=144.1, may be comprised in both the first plurality of shares and the second plurality of shares. Having shared shares that define multiple values may allow different shares to define different sets of values. For example, share 143.1=144.1 in the figure defines values 143 and 144 whereas share 143.2 defines value 143 but not value 144. This is advantageous since it helps to mitigate attacks on the respective values, e.g., share reduction and/or share localization attacks as explained.

In particular, as exemplified in various embodiments below, a value 143 defined by a shared share 143.1=144.1 may be an output value obtained by an operation unit 131 performing an operation of the computation. Such an output value, e.g., output value 143, may be defined by at least one shared share, e.g., shared share 143.1=144.1, and at least one computed share, e.g., computed share 143.2, where the at least one shared share also defines a further value, e.g., further value 144. For instance, operation unit 131 may perform the operation on a set of input values, e.g., input values 141 and 142, wherein the at least one computed share, e.g., computed share 143.2 is computed from the at least one shared share and shares of the set of input values, e.g., shares 141.1, 141.2 of input value 141 and/or shares 142.1, 142.2 of input value 142. The input values, output value and further value are comprised in the set of values. Operation 131 may for example be a unary operation, e.g., NOT or negation; a binary operation, e.g., an AND, XOR, addition, or multiplication; a ternary operation, a nullary operation, or any other operation.

As a result of the operation performed by operation unit 131, output value 143 may be defined by at least one shared share, e.g., shared share 143.1=144.1 that also defines a further value 144, and at least one computed share, e.g., computed share 143.2, that is computed from the at least one shared share and shares of input values. In particular, computed share 143.2 may not define further value 144 itself. This helps mitigate attacks such as share reduction and/or share localization attacks on output value 143.

For example, suppose output value 143 would have been defined by exactly two shares that do not define any other values of the computation. This is not the case in computation device 100. In such a case, an attacker might have been able to detect that the two shares are shares of the same value by observing that faults in the two shares have similar effects. For example, a bit flip of the first share and a bit flip of the second share might have led to the two shares still defining the same output value, and hence, to the computation still being performed on the same set of values. As a consequence, the overall output of the computation might not have been affected by the two bit-flips. More generally, for each first error added to the first share, it might have been possible to add a second error to the second share such that the output value, and hence the overall set of values on which the computation is performed, would still have been the same. This is undesirable, for instance, since it may allow an attacker to reduce, sometimes also called collapse, the two shares into a single share, allowing the attacker to determine or otherwise learn information about the output value.

However, in computation device 100, the at least one shared share 143.1=144.1 also defines a further value 144. As a consequence, introducing a fault in the least one shared share, e.g., shared share 143.1=144.1, typically leads to a fault in at least output value 143 and further value 144, and hence, to an overall computation output based on faults in both the output value and the further value. On the other hand, introducing a fault in the at least one computed share, e.g., computed share 143.2, may not lead to a fault in further value 144. Hence, the overall computation output may be based on a fault in output value 143 but not on a fault in further value 144. Hence, an attacker may not be able to deduce that the at least one shared share and the at least one computed share are shares of the same value by introducing faults in the respective shares and observing that they lead to the same set of values, e.g., by means of the overall computation output. Hence, share reduction and/or share localization attacks are mitigated.

Although the figure shows only one share 143.1=144.1 that defines multiple values 143, 144, it will be understood that typically, a memory 140 of a computation device 100 stores multiple shares that each define multiple values. For instance, an input value of the set of input values, e.g., input value 141 or 142, or each input value 141, 142 of the set of input values, may be defined by at least one shared share that also defines a respective further value. It is also not necessary that a share defines exactly one or exactly two values, for example, a share of memory 140 may define at least three or at least five values. Similarly, it is not necessary that an output value 143 is defined by exactly one shared share and exactly one computed share, e.g., a value may be defined by multiple shared shares and/or multiple computed shares. For example, each shared share may also define at least one respective further value.

Also, a computed share, e.g., computed share 143.2, may define further values; for instance, the computation may comprise a further operation whose output value is defined at least in part by share 143.2 and a further share, the further share being computed using share 143.2 as an input. Generally, however, it is advantageous if, for a first share and a second share in memory 140 that at least in part define a value, the respective sets of values that are defined by the first share and the second share are different. In a preferable embodiment, this property holds for each first share and second share that at least in part define the value. For example, value 144 is in the set of values defined by share 143.1=144.1 of value 143 but not in the set of values defined by share 143.2 of value 143. Indeed, this property helps mitigate attacks such as share reduction and/or share localization attacks as explained.

Operation unit 131 may employ various techniques to perform the operation, e.g., to compute the at least one computed share 143.1=144.1. Various examples are provided in detail below. In preferred embodiments, operation unit 131 does not explicitly compute output value 143 as an intermediate result of performing the operation and/or output value 143 is not stored in memory 140 directly, e.g., it is not stored in unshared form, while performing the operation. Similarly, operation unit 131 preferably performs the operation in such a way that explicit computation or storage of input values 141, 142 is avoided. This may further help to share reduction/localization and similar attacks based on such intermediate data.

In various embodiments, operation unit 131 computes the at least one computed share 143.2 by computing a sequence of multiple intermediate results. Each intermediate result may be computed from the at least one shared share, e.g., each intermediate result depends directly on the at least one shared share or indirectly by depending on another intermediate result that depends on the at least one shared share. Since the value of the at least one shared share is typically unrelated, e.g., uncorrelated or independent, from the input values of the operation, the intermediate results will typically be unrelated from the input values as well. Hence, the intermediate results behave sufficiently randomly, e.g., uncorrelated or independent, from the input values and/or output value. This makes it more difficult to correlate the computed share to the input values. For instance, an intermediate result may be a function of the at least one shared share 143.1=144.1, e.g., its value or its negative. An intermediate result may also be a function of the at least one shared share 143.1=144.1 and a share of an inputs of operation 131. Other intermediate results may depend on the at least one shared share by being computed based on such intermediate results.

In various embodiments, further value 144 is independent from input values 141, 142. When values are referred to as being "independent", this generally means that there is no direct relationship between the two, e.g. one value may not follow from the other, or it may even be statistically not correlated and/or statistically independent from the other. For instance, further value 144 may be uncorrelated to input values 141, 142 according to a probability distribution over inputs and/or randomness of the computation, e.g., its correlation coefficient is close to zero, say between −0.25 and 0.25 or between −0.1 and 0.1. For example, such a correlation may be experimentally established in order to select a suitable further value 144. Further value 144 may also be statistically independent from input values 141, 142, e.g., the probability that further value 144 takes on a certain value may not depend much on the probability that an input value has a certain value, e.g., the difference between the probability that further value 144 takes on a certain value and the probability that it takes on a certain value given that an input value has a certain value may be approximately the same, e.g., differ by at most 0.01 or at most 0.1. In some embodiments, the current operation and the operation computing the further value 144 have at least a minimal distance, e.g., in terms of the minimal number of instructions being executed between the respective operations, in terms of the distance between the operations in a circuit for the computation, and the like.

Further value 144 may be randomly selected, e.g., at compile-time, among a set of values, e.g., all values, all previously computed values, all sufficiently independent values, etcetera. Similarly, shared share 143.1=144.1 may be randomly selected among a set of shares, e.g., all shares, all previously computed shares, all sufficiently independent values, etcetera. Further value 144 being independent from input values 141, 142 is advantageous since an introduced fault in shared share 143.1=144.1 may result in faults in different parts of the computation, e.g., a part using output value 143 and a part using further value 144, making it harder for an attacker to identify the operation in the computation.

In some embodiments, each share defining output value 143 also defines a respective further value. For instance, not only share 143.1=144.1 is a shared share but also share 143.2 is a shared share also defining another further value (not shown). For example, computed share 143.2 may take on the role of a shared share in a later operation, e.g., output value 143 serves as a further value for that later operation.

This may have as an advantage that the likelihood of ineffective faults in shares of output value 143 is decreased and/or it is made harder to find ineffective faults. A fault, e.g., a bit flip, of a share such share 143.1=144.1 or share 143.2 may be considered ineffective if, for some inputs, the overall computation output does not change due to the fault, but for some other inputs, the overall computation output does change. It has been found that ineffective faults are undesirable because they may enable certain statistical ineffective fault analysis attacks. If computed share 143.2 does not define a further value, it may be a particularly likely candidate for an effective fault since a fault in the share may only directly affect output value 143. However, if computed share 143.2 does defines a respective further value, this may make it more likely that a fault in computed share 143.2 affect the overall computation output by changing output value 143 and/or the respective further value. For example, a fault in the computed share is more likely to be effective, e.g., it is more likely that for all inputs the fault affects the output, or it may be harder to detect that the fault is ineffective, for instance since there are few inputs for which the output is not affected.

In some embodiments, for each operation of the computation or each operation of a particularly sensitive part of the computation, each share of each output of an operation of the computation or computation part may also define a respective further value.

For some type of computations, in this way ineffective faults may be completely eliminated, or at least made unlikely. For example, the computation may comprise the evaluation of a block cipher such as AES. For instance, the computation may comprise an encoded substitution box, e.g., an AES S-box. Such an S-box may be considered as a binary circuit with 8 input bits and 8 output bits, optionally encoded byte-wise, e.g., on the 8 bits combined into a byte. The computation may also comprise an encoded addition circuit, e.g., of the AES MixColumns operation. Using a byte-wise encoding, the addition may be regarded as a circuit with 16 input bits and 8 output bits. Using a nibble-wise encoding, the addition maybe regarded as a circuit with 8 input bits and 4 output bits. For instance, for operations of one or more of such sub-computations, each share defining an output value also defines a respective further value. The respective further value in AES-related embodiments may belong to an AES state, e.g., an AES state of a different part of the plaintext. By construction of the AES function, this may guarantee that any fault in such a shared share result in a modified ciphertext.

In various embodiments, output value 143 may be used as an input of multiple further operations, e.g., operations of the computation. In some embodiments, some of these further operations are interleaved. For instance, a first further operation and a second further operation are performed during at least partially overlapping time intervals. Typically, an operation comprises multiple parts, e.g., machine code instructions, source code instructions, or the like. When the operations are interleaved, some instructions of the second operation may be performed before the last instruction of the first operation while some other instructions of the second operation may be performed after the last instruction of the first operation.

Interleaving the operations may further complicate certain types of attacks. For instance, an attacker may not just attempt to introduce a fault in shares of output value 143 when these shares are computed, but also later, when they are used. Introducing a fault in a share of output value 143 when it is computed may inflict internal changes in all operations in which the share is subsequently used. In particular, if the share defines multiple values, the fault may affect several or even all of these values. On the other hand, introducing a fault in a share after it has been used for a first further operation but before it has been used for a second further operation may only affect the output of that second further operation, partly reversing the effect of sharing shares between multiple values. Interleaving the further operations may make such attacks more complicated since it is avoided that there is a single point in time where introducing a fault affects the first further operation but not the second further operation.

Several detailed embodiments are now presented in which various techniques discussed above for performing the operation are advantageously combined.

In some embodiments, operation unit 131 performs the operation based on a shared share 143.1=144.1 that also defines an output 144 of an operation of the computation performed previous to the current operation. For example, the value of the at least one shared share 143.1=144.1 has been computed by operation unit 131 when performing this previous operation, e.g., as described herein. In such a case, the at least one shared share may not need to be recomputed and/or modified as part of the current operation. Operation unit 131 may compute the at least one computed share 143.2 from the previously computed shared share 143.1=144.1 and shares of the set of input values of operation 131.

For instance, in an embodiment, operation unit 131 may be configured to perform an AND operation. Input value $z_k$, 141 may be stored as shares $z_k = s_{k,0}$ xor $s_{k,1}$, 141.1, 141.2. Input value $z_l$, 142 may be stored as shares $z_l = s_{l,0}$ xor $s_{l,1}$, 142.1, 142.2. Output value $z_j = z_k$ and $z_l$, 143 may be stored after the operation as shares $z_j = s_{j,0}$ xor $s_{j,1}$, where $s_{j,0}$, 143.1=144.1 is a shared share and $s_{j,1}$, 143.2 is a computed share. Computing the computed share may comprise computing one or more ANDs of shares of the first value and shares of the second value, for example, each pair of a share of the first value and a share of the second value. The shares of the first and second value may also be partially combined, e.g., an AND may be computed of a XOR of multiple shares of the first value with one or more shares of the second value, and the like. Computing the computed share may then further comprise XORing the shared share with the compute one or more ANDs.

For example, operation unit 131 may use the following steps to perform AND operation, with intermediate results denoted by variables $c_i$:

1. $c_0 = s_{k,1}$ and $s_{l,1}$
2. $c_4 = s_{j,0}$ xor $c_0$
3. $c_1 = s_{k,0}$ and $s_{l,1}$
4. $c_5 = c_4$ xor $c_1$
5. $c_2 = s_{k,1}$ and $s_{l,0}$
6. $c_6 = c_5$ xor $c_2$
7. $c_3 = s_{k,0}$ and $s_{l,0}$
8. $s_{j,1} = c_6$ xor $c_3$ As demonstrated in this example, input values $z_k = s_{k,0}$ xor $s_{k,1}$ and $z_l = s_{l,0}$ xor $s_{l,1}$ and output value $z_j = s_{j,0}$ xor $s_{j,1}$ may not be computed as an intermediate result of performing the AND operation. Moreover, computing computed share $s_{j,0}$ may comprise determining an intermediate result $c_4$ based on shared share and some shares of the input values, e.g., based on shares $s_{k,1}$ and $s_{l,1}$, but not others, e.g., not based on shares $S_{k,0}$ and $s_{l,0}$. As explained above, these measures further complicate attacks on the operation. Shared share may be a share of a further value 144 that is independent from input values 141 and 142, e.g., shared share 143.1=144.1 may be randomly selected from a set of previously computed shares and/or further value 144 may be randomly selected from a set of previously computed values, e.g., previously computed values that are sufficiently independent from the input values.

As will be understood, the above example may be adapted in various ways while still achieving the same result, e.g., by changing the order of the steps and/or swapping shares of input values.

It will be understood that the above techniques for performing an AND operation using XOR-sharing may be adapted to perform similar kinds of operations, e.g., operations that are distributive with respect to the reconstruction operation of the sharing, e.g., XOR. For instance, the above procedure may be adapted to perform multiplication, e.g., in a ring of integers modulo a given modulus with additive shares. For example, to perform multiplication, in the above steps 1-8, ring multiplications may be performed instead of ANDs, ring additions may be performed instead of XORs, and shared share $s_{j,1}$ may be negated in step 2.

In a further embodiment, operation unit 131 may be configured to perform a XOR operation. Input value $z_k$, 141 may be stored as shares $z_k = S_{k,0}$ xor $s_{k,1}$, 141.1, 141.2. Input value $z_l$, 142 may be stored as shares $z_l = s_{l,0}$ xor $s_{l,1}$, 142.1, 142.2. Output value $z_j = z_k$ xor $z_l$, 143 may be stored after the operation as shares $z_j = s_{j,0}$ xor $s_{j,1}$, where $s_{j,0}$, 143.1=144.1 is a shared share and $s_{j,1}$, 143.2 is a computed share. Performing the XOR operation may comprise computing multiple XORs of the shared share 143.1=144.1, shares 141.1, 141.2, 142.1. 142.2 of the input values, and/or intermediate results from computing said XORs. For example, the following steps may be used to perform the XOR operation, with intermediate results denoted by variables $c_i$:

1. $c_0 = s_{j,0}$ xor $s_{k,1}$
2. $c_1 = c_0$ xor $s_{l,1}$
3. $c_2 = c_1$ xor $s_{k,0}$
4. $s_{j,1} = c_2$ xor $s_{l,0}$ Also for XOR operations, the input values and output value may not be computed as an intermediate result of performing the operation. Moreover, an intermediate result such as $c_0$ may be determined that does not depend at least on shares $s_{j,0}$ and $S_{k,0}$ and its determination may not require any intermediate result in which the shared share $s_{j,1}$ is not used. Thereby, further attacks on the operation are made more complicated. As above, the further value that $s_{j,1}$ defines may be independent from input values 141, 142. It will be understood that the above techniques for performing an XOR operation may be adapted to other kinds of computations, e.g., performing additions or subtractions on additive shares and/or to perform variations on the above steps, e.g., swapping shares or changing the order of the steps.

Figure 2:
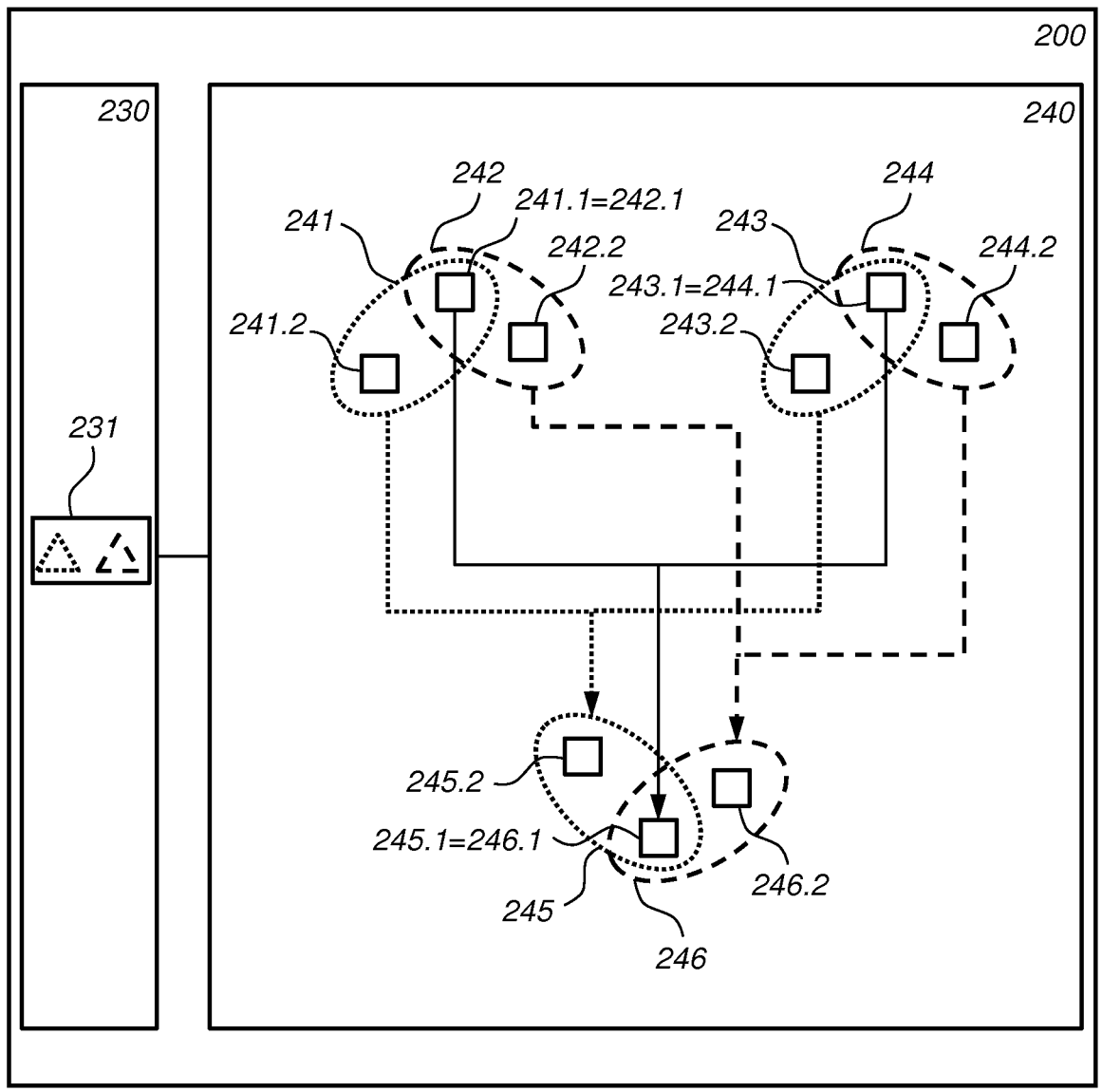

FIG. 2 schematically shows an example of an embodiment of a computation device 200. Computation device 200 is for performing a computation on at least a set of values, e.g., values 241, 242, 243, 244, 245 and/or 246. Computation device 200 may comprise a memory 240 configured to store the set of values.

Each value of the set of values may be stored as a plurality of shares that define the value. For example, value 241 may be stored as shares 241.1=242.1 and 241.2. Value 242 may be stored as shares 241.1=242.1 and 242.2. Value 243 may be stored as shares 243.1=244.1 and 243.2. Value 244 may be stored as shares 243.1=244.1 and 244.2. In this figure, pair of values 241, 242 and pair of values 243, 244 each have a shared share, but this is not necessary at least for some of the embodiments discussed below. Value 245 may be stored as shares 245.1=246.1 and 245.2. Value 246 may be stored as shares 245.1=246.1 and 246.2, e.g., share 245.1=246.1 may be a shared share.

Computation device 200 may further comprise a processor configured to perform operations of the computation. Various examples of such computation devices 200, processors 230, and/or memories 240 have been provided above, e.g., computation device 200, processor 230 and/or memory 240 may be based on computation device 100, processor 130, and/or memory 140, respectively.

Similarly to other computation devices described herein, computation device 200 may comprise an operation unit 231 configured to perform an operation of the computation on a set of input values 241, 243 to obtain an output value 245. In addition, operation unit 231 may be configured to perform a further operation of the computation on a further set of input values 242, 244 to obtain a further output value 246. Although in the figure, the respective operations have two inputs, this is not necessary: the operations may be nullary, trinary, etc. It is also not necessary that the operations have the same number of inputs as each other.

Interestingly, at least one shared share 245.1=246.1 defines both output value 245 and further output value 246. Output value 245 is further defined by at least one computed share 245.2 and further output value 246 is further defined by at least one further computed share 246.2. The operations performed by operation unit 231 typically do not depend on each other, e.g. the operation does not have an input that depends on an output of the further operation and the other way around. Hence, the two operations can be performed at substantially the same time, e.g., in an interleaved fashion. Preferably, the operations are independent from each other such that shared share 245.1=246.1 affects unrelated parts of the computation. In some embodiments, the operation and the further operation are the same operation, but generally they are applied to different inputs.

In order to perform the operations, operation unit 231 may compute the at least one computed share 245.2 and the at least one further computed share 246.2 based on shared share 245.1=246.1. Preferably, the value of the at least one shared share is independent of, e.g., has low correlation with, the inputs of the respective operations, e.g., inputs 241-244. This may ensure that shared share 245.1=246.1 and/or other shares of values 245, 246 leak as little information about the respective values as possible.

In some embodiments, shared share 245.1=246.1 also defines a previous value that is an output of an operation performed previously to the operations. Hence, shared share 245.1=246.1 is a shared share between at least three values of the computation. In such cases, operation unit 231 typically does not compute shared share 245.1=246.1 when performing the operations. Performing the operation then comprise computing the at least one computed share 245.2 from the at least one shared share 245.1=246.1 and shares 241.1=242.1, 241.2, 243.1=244.1, 243.2 of the set of input values, e.g., along the lines of operation 131 performed by computation device 100. Similarly, performing the further operation may comprise computing the at least one computed share 246.2 from the at least one shared share 245.1=246.1 and shares 241.1=242.1, 242.2, 243.1=244.2, 244.2 of the further set of input values, e.g., along the lines of operation unit 131 of computation device 100. In such embodiments, it is not necessary that pairs of values 241, 242 and 243, 244 have a shared share.

In other embodiments, operation unit 231 computes shared share 245.1=246.1 as part of performing the operations. To ensure independence of the shared share of input values 241-244, in various embodiments, the at least one shared share 245.1=246.1 is determined based on a random value. For example, the random value may be a value generated by a randomness source or a pseudo-random number generator. In some attack scenarios, however, it may be possible for an attacker to control such sources of randomness. Hence, in some embodiments, the random value advantageously is a share of an output of a previously performed operation.

Having computed shared share 245.1=246.1, operation unit 231 may continue performing the operations by computing the at least one computed share 245.2 from the at least one shared share 245.1=246.1 and shares 241.1=242.1, 241.2, 243.1=244.1, 243.2 of the set of input values. Similarly, operation unit 231 may compute the at least one computed share 246.2 from the at least one shared share 245.1=246.1 and shares 241.1=242.1, 242.2, 243.1=244.2, 244.2 of the further set of input values.

Both these computations may be performed along the lines of operation unit 131 of computation device 100 discussed above. However, computation device 200 may also advantageously use the fact that inputs of the respective computations have shared shares between them, e.g., first input 241 of the operation and first input 242 of the further operation may have shared share 241.1=242.2, and similarly for second inputs 243 and 244. In such cases, operation unit 231 may compute the at least one shared share 245.1=246.1 based on shared shares between respective inputs of the respective computations, e.g., also using the random value as described above. This computed at least one shared share 245.1=246.1 may then be used to compute the computed shares.

For example, in an embodiment, the operations may both be AND operations. Input and output values may be stored as shares by XOR-sharing. For example, input value $z_k$, 241 may be stored as shares $r_k$, 241.1=242.1 and $z_k^1$, 241.2 by XOR-sharing $z_k = r_k$ xor $z_k^1$. Further input value $z_{k'}$, 242 may be stored as shares $r_k$, 241.1=242.2 and $z_k^2$, 242.2 by XOR-sharing $z_k' = r_k$ xor $z_k^2$. Similarly, input value $z_l$, 243 may be stored as shares $r_l$, 243.1=244.1 and $z_l^1$, 243.2 by XOR-sharing $z_l = r_l$ xor $z_l^1$. Further input value $z_l'$, 244 may be stored as shares $r_l$, 243.1=244.2 and $z_l^2$, 244.2 by XOR-sharing $z_l' = r_l$ xor $z_l^2$. Additional input values may be shared in the same way. Output value $z_j = z_k$ and $z_l$, 245 may be stored as shares $r_j$, 245.1=246.1 and $z_j^1$, 245.2 by XOR-sharing $z_j = r_j$ xor $z_j^1$. Further output value $z_j' = z_k'$ and $z_l'$, 245 may be stored as shares $r_j$, 245.1=246.2 and $z_j^2$, 242.2 by XOR-sharing $z_j' = r_j$ xor $z_j^2$.

To perform the AND-operations, operation unit 231 may compute the at least one shared share as an AND of shared shares of respective inputs masked with the random value. Operation unit 231 may further compute the at least one computed share as a XOR of ANDs of shares of the respective inputs, masked with the same value. Similarly, operation unit 231 may compute the at least one further computed share as a combination, e.g., XOR, of ANDs of shares of further inputs masked with the same random value. Masking output shares with the random value may improve their independence from the input and output values.

For instance, the following steps may be used by operation unit 231 to compute two AND operations using intermediate values $c_i$ and random value s, e.g., s may be a share of an output of a previously performed operation:
1. $c_0 = r_k$ and $r_l$
2. $r_j = c_0$ xor s
3. $c_0 = r_k$ and $z_l^1$
4. $c_1 = r_l$ and $z_k^1$
5. $z_k^1$ and $z_l^1$
6. $r_j$ xor $c_1$
7. $z_j^1 = c_3$ xor $c_2$
8. $c_0 = r_k$ and $z_l^2$
9. $c_1 = r_l$ and $z_k^2$
10. $c_2 = z_k^2$ and $z_l^2$
11. $c_3 = r_j$ xor $c_1$
12. $z_j^2 = c_3$ xor $c_2$ In particular, as demonstrated in this example, input values 241 and 243, further input values 242, 244, output value 245 and/or further output value 246 may not be computed as intermediate results of performing the operations. Furthermore, in order to obtain computed share $z_1^j$, random value s may first be XORed with $c_0$, then with $c_1$, then with $c_2$. Thus, independence of intermediate values of the operations with inputs and outputs of the respective computations may be improved, complicating attacks on these values as explained above. It will be understood that the above steps may be adapted, e.g., by re-ordering them or swapping shares of input values. It will also be understood that the above steps may be generalized to performing any operation that is distributive over the sharing used, for instance, ring multiplication using additive sharing, e.g., modulo a given modulus.

In some embodiments, the operations may be XOR operations. Input and output values may be XOR-shared as explained for AND operations above. To perform a XOR operation, operation unit 231 may compute the at least one shared share 245.1=246.1 as a XOR of shared shares of respective inputs, e.g., shared share 241.1=242.1 and shared share 243.1=244.1. Operation unit 231 may also compute the at least one computed share, e.g., share 245.2, as a XOR of shares of respective input values, e.g., shares 241.2 and 243.2. Operation unit 231 may further compute the at least one further share, e.g., share 246.2, as a XOR of shares of respective further input values, e.g., share 242.2 and 244.2. For example, performing the XOR operations may comprise the following steps or variations, e.g., by re-ordering or swapping:
1. $r_j = r_k$ xor $r_l$
2. $z_j^1 = z_k^1$ nor $z_l^1$
3. $z_j^2 = z_k^2$ xor $z_l^2$ Analogously, the operations may be XOR operations with respective constants $K^1$ and $K^2$, XOR-shared as described above. For example, the output value is computed from an input value as a XOR with constant $K^1$ and the further output value computed from a further input value as a XOR with constant $K^2$. In this case, the output value and the further output value may both be defined by the shared share that also defines the input value and the further input value. The output value may be additionally defined by a computed share computed from shares of the input value and the further output value may be additionally defined by a further computed share computed from shares of the further input value. Operation unit 231 may perform such XOR operations using the following steps:
1. $z_j^1 = z_k^1$ xor $K^1$
2. $z_j^2 = z_k^2$ xor $K^2$ E.g., shared share $r_j$ of the output value and the further output value is the same share as shared share $r_k$ shared between the input values. Computed share $z_j^1$ of the output value is computed from share $z_k^1$ of the input value, e.g., a computed share. Computed share $z_j^2$ of the further output value is computed from share $z_k^2$ of the further input value, e.g., a computed share. Again, input values, further input values, output values, and/or further output values may occur as intermediate results of performing the operation and the further operation. In the case of XOR operations, no separate random value may be needed.

Figure 3A:
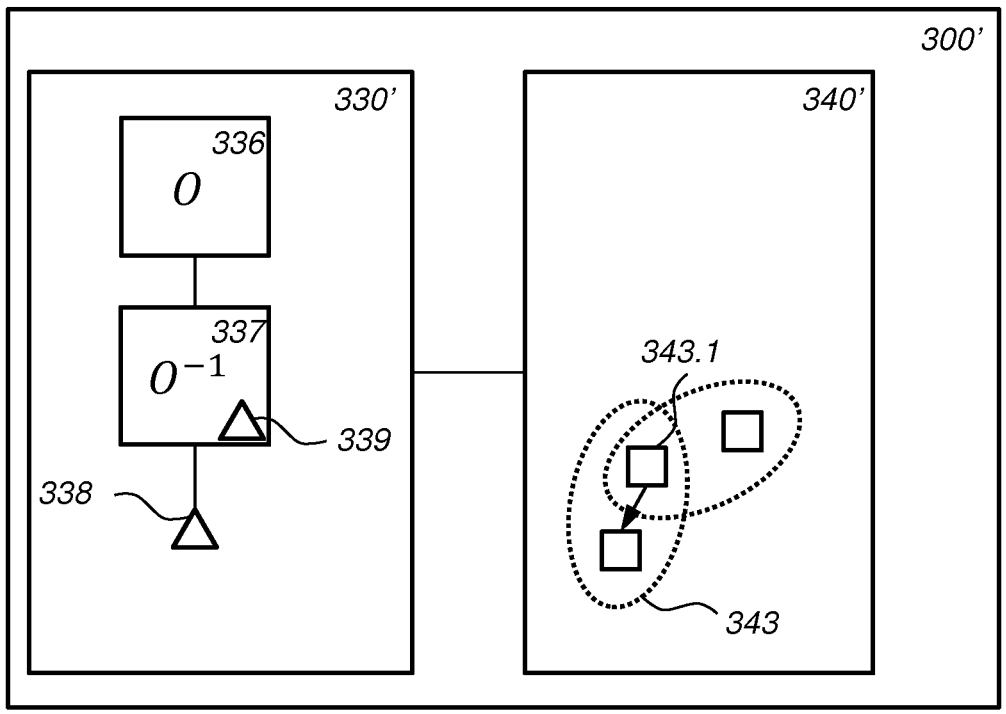

FIG. 3a schematically shows an example of an embodiment of a computation device 300' for performing a computation at least a set of values. Computation device 300' may be based on various appropriate computation devices described herein, e.g., computation device 100 or 200. Computation device 300' comprises a processor 330' and a memory 340', e.g., processor 130 or 230 and memory 140 or 240.

Computation device 300' may comprise an operation unit 338 configured to perform an operation. The operation may result in an output value 343 that is defined at least in part by at least one shared share 343.1. In various embodiments described herein, operation unit 338 uses a share of an output of an operation previously performed by an operation unit 339. For example, operation unit 338 is based on operation unit 131. For instance, the at least one shared share 343.1 may itself define an output of the operation of operation unit 339, or the at least one share 343.1 is computed using at least one share of the output of the operation of operation unit 339 as a random value. In such cases, it may be beneficial if the output of the previously performed operation and/or its shares are random and independent from the operation performed by unit 338, e.g., the value of the output of the previously performed operation is not correlated with a value of any input of the operation of unit 338. Although operation units 338 and 339 are shown as separate units in the figure, they may be combined into a single unit.

Interestingly, computation device 300' may comprise an initial obfuscation computation unit 336 configured to perform an initial obfuscation computation. Computation device 300' may also comprise an inverse obfuscation computation unit 337 configured to compute an inverse of the initial obfuscation computation based on, e.g., from, outputs of unit 336. Obfuscation computation unit 336 and/or inverse obfuscation computation unit 337 may operate at least in part using shares, e.g., using operations units according to embodiments described herein. For instance, in an embodiment, obfuscation computation unit 336 does not use share but inverse obfuscation computation unit 337 uses shares. Performing the obfuscation computation and its inverse may not affect the overall output of the computation, but may advantageously produce shares that can be used for subsequent operations as described above. Operation unit 339 may perform an operation of obfuscation computation unit 336 or inverse obfuscation computation unit 337 that is performed using shares as the previously performed operation.

For example, as shown in the figure, operation unit 339 may perform an operation of the inverse obfuscation computation. This may have as an advantage that the output of the operation of unit 339 and/or its shares are random, e.g., they may be independent from the computation input because the obfuscation computation has been applied and/or independent from inputs of the operation of unit 338 because of remaining steps of the inverse and/or other steps between the operation of unit 339 and the operation of unit 338. The previously performed operation may also be comprised in the obfuscation computation of unit 336, if performed using shares, preferably near the end of the obfuscation computation. The obfuscation computation and its inverse may be performed at or near the start of the overall computation, but at least before the operation of unit 338.

Various obfuscation computations may be applied. In an embodiment, the obfuscation computation comprises one or more rounds of a block cipher, e.g., a SLT cipher such as AES, e.g., with randomly chosen round keys. In an embodiment, the obfuscation computation comprises a random linear function followed by a random non-linear function, e.g., followed again by a random linear function and a random non-linear function. In an embodiment, the inverse obfuscation computation may comprise an inverse of the random non-linear function, followed by an inverse of the random linear function, e.g., followed again by the inverse of the random linear function and the inverse of the random linear function. For instance, for $i=0, \ldots, 15$, random non-linear bijective functions $S_i: \{0,1\}^8 \to \{0,1\}^8$ and random linear function $L: \{0,1\}^{128} \to \{0,1\}^{128}$ may be generated. The overall computation may have a 128-bit input x, where $x^b$ denotes its bth byte and $x_i$ denotes its ith bit, e.g., $x=x^0 \ldots x^{15}=x_0 \ldots x_{127}$. Function $S: \{0,1\}^{128} \to \{0,1\}^{128}$ may be defined by $S(x)=S_0(x^0) \ldots S_{15}(x^{15})$. The obfuscation computation may comprise computing $y=S(L(S(L(x))))$, e.g., using an arithmetic boolean circuit that on input x computes y.

In various embodiments, the obfuscation computation and/or its inverse may result in shares of computation input values. For example, operation unit 338 may perform its operation on a computation input value. Obtaining shared computation input values may comprise performing the obfuscation computation on inputs to the computation to obtain obfuscated computation inputs, e.g., not using shares, converting the obfuscated computation inputs to obfuscated computation input values stored as shares, and performing the inverse of the obfuscation computation on the obfuscated computation input values to obtain shares of the set of computation input values.

For instance, sharing an obfuscated computation input value may result in at least one shared share $z_j$ and at least one computed share $s_i$, e.g., as $z_j$ xor $s_i$. The at least one shared share $z_j$ may, for instance, be selected as an intermediate result of the obfuscation computation, preferably near the end of the obfuscation computation, e.g., a result of computation $S(L(x))$ above. The at least one shared share may also be another obfuscated computation input, etcetera. The at least one computed share may be computed from the obfuscated computation input value $y_i$ and the at least one shared share, e.g., $s_i = y_i$ xor $z_j$. Hence, interestingly, shares of the obfuscated computation input value may be random and/or independent from the value they represent, e.g., by virtue of the at least one shared share having a random value and the at least one computed share being computed from it.

Figure 3B:
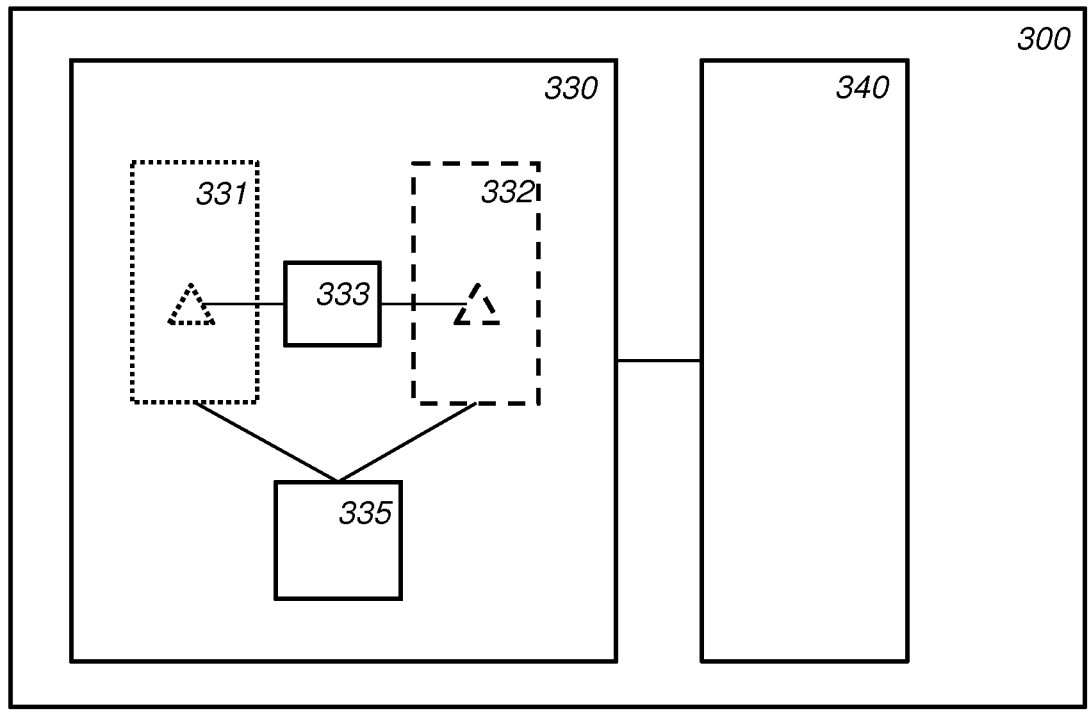

FIG. 3b schematically shows an example of an embodiment of a computation device 300. Computation device 300 comprises a processor 330 that performs a computation at least on a set of values stored in a memory 340, e.g., based on computation device 100, 200, and/or 300'. Computation device 300 may comprise a parallel computation branch unit 331 performing a first parallel computation branch of the computation and a parallel computation branch unit 332 performing a second parallel computation branch of the computation. Each parallel computation branch, e.g., the branches of units 331 and 332 and any additional parallel computation branches, may compute a copy of the same output. Computation device 300 may further comprise an averaging computation unit 335 configured to perform an averaging computation that combines these multiple copies of the same output into a single computation output.

As is known per se in the art, using parallel computation branches and/or averaging computations may complicate various attacks, e.g., differential fault analysis attacks and the like, on the computation performed by computation device 300. For instance, this may be because introducing a fault in one parallel computation branch but not the other and/or introducing different faults in respective parallel computation branches may lead to random outputs of the averaging computation.

In an embodiment, averaging computation unit 335 may be arranged to return, given two equal values as input, that value, but otherwise return a random value. For instance, given output $W'_1$ of first parallel computation branch unit 331 and output $W'_2$ of second parallel computation branch unit 332, averaging computation unit 335 may evaluate a random function on $W'_1$ and the identity function minus the random function on $W'_2$, and add the two results. For instance, using XOR-sharing on 128 bits, an invertible linear function $L': \{0,1\}^{128} \to \{0,1\}^{128}$ may be used such that $L_2(X) = (L'$ xor $I)(x) = L'(x)$ xor $x$ is also invertible, and output $Z'$ of averaging computation unit 335 may be computed as $Z'=L'(W'_1K)$ xor $L_2(W'_2)$, e.g., using a binary circuit evaluated on shares. Operations of averaging computation unit 335 may for instance be evaluated as discussed for operation unit 131 of computation device 100, or shared values of the respective parallel computation branches may be re-shared before being provided to averaging computation unit 335, e.g., as discussed for computation device 800.

Using parallel computation branches is particularly advantageous when the computation of computation device 300 comprises an operation and a further operation wherein a shared share defines both an output of operation and an output of further operation. For instance, computation device 300 may comprise an operation unit 333 configured to perform the operations, e.g., based on operation unit 231 of computation device 200. In such cases, the operation may be comprised in the first parallel computation branch and the further operation may be comprised in the second parallel computation branch. Hence, the parallelism may effectively be used to obtain shared shares for free, in the sense that the two parallel computation branches provide sufficiently independent computation paths for them to be able to effectively use shared shares. In some embodiments, parallel computation branch units 331, 332 compute similar functions, e.g., functions described by a circuit of similar structure. In such a case, e.g., a shared share can define respective operations of both circuits, providing a particularly efficient and effective way to perform operations and further operations with a shared share.

It will be understood that more than two parallel computation branches can be applied, with averaging computation unit 335 adapted accordingly. In such cases, a single shared share may be shared among values from two or more parallel computation branches, e.g., a shared share may define values from each parallel computation branch.

Figure 4:
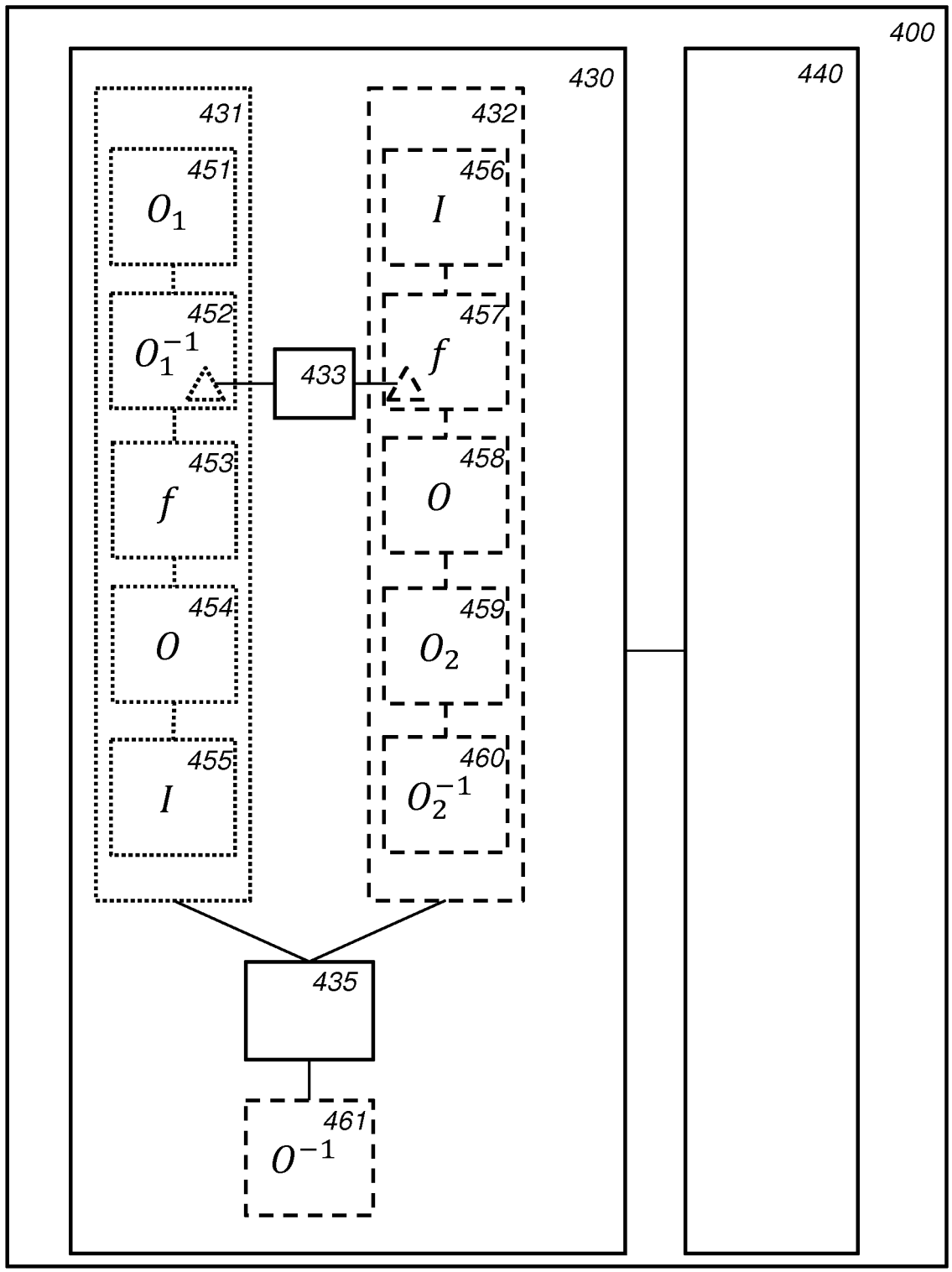

FIG. 4 schematically shows an example of an embodiment of a computation device 400. Computation device 400 comprises a processor 430 that performs a computation on at least a set of values stored in memory 440 as shares, as described in various embodiments discussed herein. Computation device 400 may comprise at least a first parallel computation branch unit 431 and a second parallel computation branch unit 432. Each parallel computation branch unit, e.g., parallel computation branch units 431 and 432, may compute a copy of the same output, and the computation device may further comprise an averaging computation unit 435 that combines these multiple copies into a single output. For instance, units of computation device 400 may be based on respective units of computation device 300'.

In an embodiment, first parallel computation branch unit 431 may comprise an obfuscation computation unit 451 performing an obfuscation computation. Its outputs may be used by an inverse obfuscation computation unit 452 that computes an inverse of the obfuscation computation. Outputs of unit 452 may be used by a functional computation unit 453 performing a functional computation. Outputs of unit 453 may be used by a dummy computation unit 455 to perform a dummy computation.

Second parallel computation branch unit 432 may comprise a dummy computation unit 456 configured to perform a dummy computation. Outputs of unit 456 may be used by a functional computation unit 457 configured to perform the functional computation. Outputs of unit 457 may be used by an obfuscation computation unit 459 configured to perform an obfuscation computation. Outputs of unit 459 may be used by an inverse obfuscation computation unit 460 configured to compute an inverse of the obfuscation computation. Introducing obfuscation and/or dummy computations may have as an advantage that respective operations of the parallel computation branches operate on different values, e.g., values that are independent or uncorrelated to each other. Moreover, it may be harder for an attacker to understand the structure of the computation. For instance, because functional computations units 453, 457 operate in different stages of the respective parallel computation branches due to the obfuscation and dummy computations, it may be harder to identify the functional computations.

Preferably, the obfuscation computations, their inverses, the dummy computations, and/or the functional computations are comprised of similar or even identical parts, e.g., with similarly-shaped or identically-shaped circuits. This may make the identification of corresponding values of different parallel computation branches even more difficult and/or allow operations of the branches to be performed pairwise, e.g., as by operation unit 231 of computation device 200. For instance, obfuscation computation unit 451 may be similarly configured as dummy computation unit 456, inverse unit 452 may be similarly configured as an initial part of functional computation unit 457, and/or dummy computation unit 455 may be similarly configured as inverse unit 460, e.g., they compute similarly-structured circuits.

For instance, in an embodiment, the functional computation may comprise multiple rounds of an invertible iterative computation. The invertible iterative computation can be a block cipher round, e.g., of AES; however, other types of invertible iterative computation are also possible, e.g., an iteration of the simplex algorithm for linear programming. For instance, the invertible iterative computation may be provided as a binary circuit, e.g., obtained using a synthesis tool/circuit compiler.

Obfuscation computation unit 451 may be configured to perform two iterations of the iterative computation. Inverse unit 452 may be configured to compute respective inverses of the two iterations. Functional computation units 453, 457 may each be configured, e.g., to perform multiple rounds of the invertible iterative computation, e.g., 10, 12, or 14 AES rounds. Dummy computation unit 455 may be configured to compute an iteration of the iterative computation and its inverse. Dummy computation unit 456 may be configured to compute an iteration and its inverse. Obfuscation computation unit 459 may be configured to compute two iterations of the iterative algorithm and inverse unit 460 may be configured to compute the respective inverses. This way, respective parallel computation branches may pairwise perform similarly-structured computations on their respective inputs. E.g., at some moment in time, parallel computation branch unit 431 and parallel computation branch unit 432 may at various point perform the same computation function but on different data, e.g., in different rounds. For instance, in first parallel computation branch unit 431, functional computation unit 453 may operate at a later stage in the branch than the corresponding functional computation unit 457 of second parallel computation branch unit 432. It will be appreciated that variations achieving the same effect may also be used. Various operations of units 451-460 may be performed using techniques described herein. For instance, one or more operations of the respective computations may be performed as discussed for operation unit 131 of computation device 100. Instead or in addition, one or more pairs of respective operations of first parallel computation branch unit 431 and second parallel computation branch unit 432 may be performed by an operation unit 433 analogous to operation unit 231 of computation device 200. For instance, operation unit 233 may perform an operation of obfuscation computation unit 451 and a further operation of dummy computation unit 456, etcetera. For example, the operations may be operations at similar or identical positions in circuits for the computations of the respective parallel computation branch units 431, 432. Interestingly, still, respective input values of the operations may be independent. In order to facilitate operations being carried out according to respective embodiments, a re-sharing of various values may be performed, e.g., by re-sharing unit 731 of computation device 700, for outputs of obfuscation operation unit 451 and dummy operation unit 456. Instead or in addition, a re-sharing, e.g., by re-sharing unit 831 of computation device, may be performed for respective inputs of dummy operation unit 455 and inverse obfuscation operation unit 460.

In an embodiment, the operation of operation unit 433 may be an operation of inverse operation unit 452 or functional computation unit 453 and the further operation of operation unit 433 may be an operation of functional computation unit 457 or obfuscation operation unit 459. This may have as an advantage that the operation and the further operation are preceded and succeeded by several other computations, making it harder to identify execution of the operation.

In an embodiment, each parallel computation branch may further comprise a further obfuscation computation following the functional computation, for instance, first parallel computation branch unit 431 may comprise further obfuscation computation unit 454 configured to perform the further obfuscation operation and second parallel computation branch unit 432 may comprise further obfuscation computation unit 458 configured to perform the further obfuscation operation, and similarly for any additional parallel computation branches. As above, further obfuscation computation units 454, 458 are preferably similar, e.g., have a similar or identical circuit, to the units discussed above, e.g., obfuscation operation units 454, 458 compute one or more block cipher rounds such as AES rounds, e.g., two rounds. The operation of operation unit 433 may be comprised in the obfuscation computation of unit 454 and/or the further operation of unit 433 may be comprised in the obfuscation computation of unit 458. The computation device may further comprise an inverse obfuscation computation unit 461 configured to compute an inverse of the further obfuscation operation of units 454, 458 on outputs of averaging computation unit 435. Hence, the overall computation output may not be affected by the obfuscation operation while individual values processed by averaging computation unit 435 may be independent from the eventual computation output, making the computation device even harder to attack.

Although inverse obfuscation operation unit 461 may act on shares, e.g., as discussed for computation device 100 and 200, in an embodiment, inverse unit 461 is configured to act on unshared values, e.g., values that are not stored in memory as multiple shares. For instance, processor 430 may reconstruct output values of averaging computation unit 435 to obtain unshared output values, e.g., by applying a reconstruction function on respective shares of the output value, e.g., a XOR or addition of the respective shares. Inverse obfuscation computation unit 461 may then act on the unshared values, e.g., by evaluating a binary circuit on the unshared values and the like. For instance, the output of inverse obfuscation computation unit 461 may be the overall output of the computation.

Figure 5:
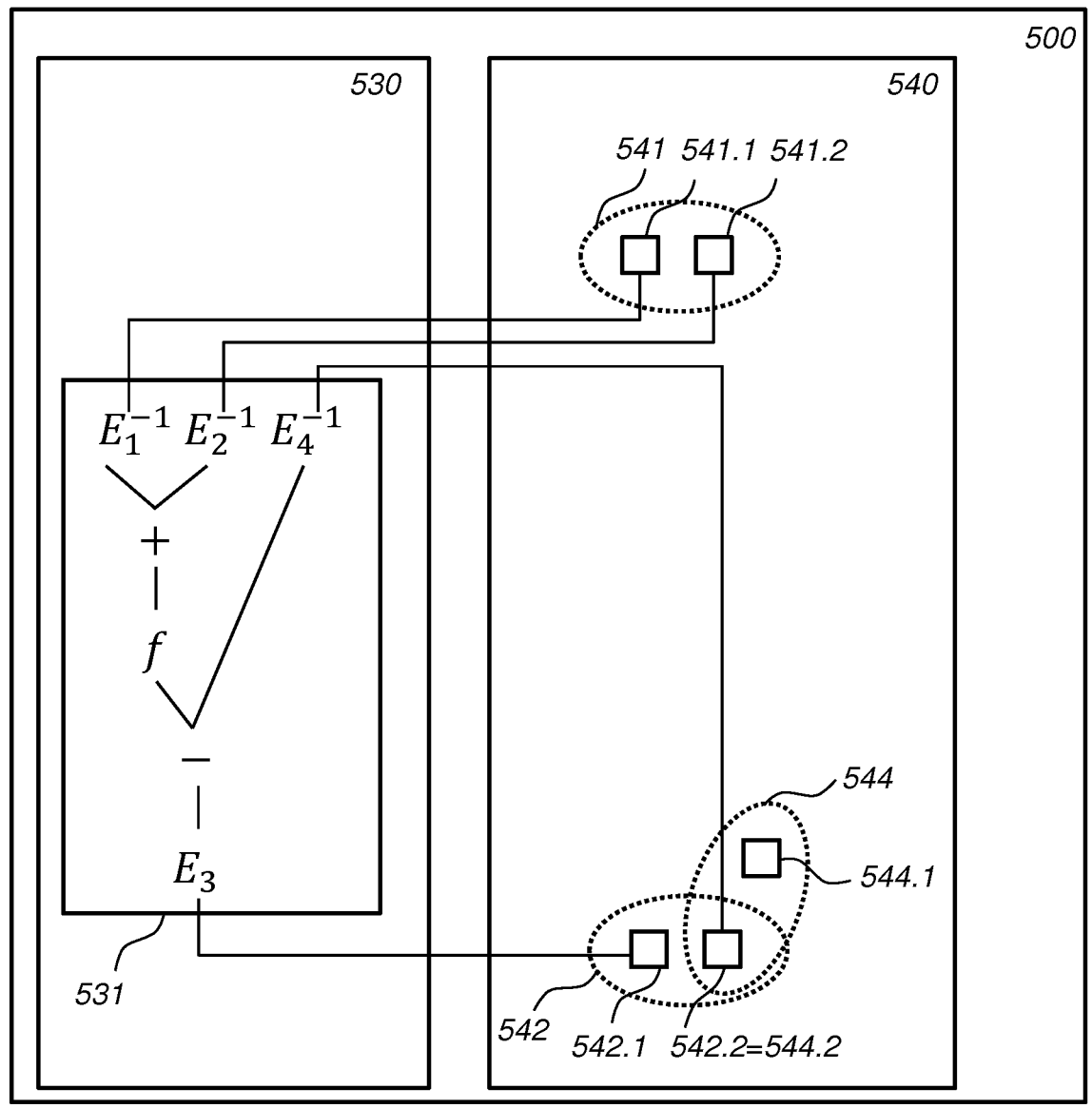

FIG. 5 schematically shows an example of an embodiment of a computation device 500 for performing a computation on at least a set of values, each value being stored as a plurality of shares. Computation device 500 comprises a processor 530 and a memory 540. For example, computation device 500 may be based on computation device 100, 200, 300, 300', and/or 400. Interestingly, a share of the plurality of shares stored in memory 540, e.g. share 542.1 of value 542, may be stored encoded, further complicating attacks since the value of share 540 cannot be read directly from memory without knowledge of the encoding used.

In an embodiment, a share of a value stored in memory may be stored encoded by applying an encoding function to the share itself. For instance, storing a value as a plurality of shares may comprise obtaining a share of the value, computing an encoded share from the obtained share using an encoding function, and storing the encoded share. Obtaining a share from the memory may comprise obtaining the encoded share and applying an inverse of the encoding function.

For instance, computation device 500 may comprise an encoded operation unit 531 configured to perform an operation at least on an input value 541 to obtain output value 542. Input value 541 may be stored as shares 541.1 and 541.2, where share $s_{1,1}$, 541.1 may be stored as an encoded value $E_1(s_{1,1})$ and share $s_{1,2}$, 541.2 may be stored as an encoded value $E_2(S_{12})$. Similarly, output value 542 may be stored as shares 542.1 and 542.2=544.2, where share $s_{2,1}$, 542.1 may be stored as an encoded value $E_3(s_{2,1})$ and share $s_{2,2}$, 542.2=544.2, may be stored as an encoded value $E_4(s_{2,2})$. For instance, share 542.1 may be a computed share computed when performing an operation 531 and share 542.2=544.2 may be a shared share also defining a further value 544, e.g., share 542.2=544.2 may define further value 544 together with another share 544.1 that may or may not be stored encoded. For instance, encoded operation unit 531 may be based on operation unit 131 or 231 adapted to apply encodings.

The $E_i$ may be encoding functions. For example, an encoding function $E_i$ may comprise a random non-linear invertible function and/or a random linear function, or other known encodings. Not all values need to be stored encoded, and not even all shares of a single value need to be stored encoded: even if not all shares and/or values are encoded, attacks still are made more difficult. For instance, sensitive values may be stored encoded; some less sensitive values may be stored unencoded. Different encoding functions may be used for different values, but, e.g., because of efficiency considerations, multiple values may also be encoded using the same encoding function.

For instance, in an adaptation of operation unit 131, encoded operation unit 531 may compute the at least one computed share 542.1 of operation 531 from the at least one shared share 542.2=544.2 by computing one or more shares of input values from encoded shares of input values stored in memory 540, e.g., using respective inverses of encoding functions. For instance, as shown in the figure, encoded operation unit 531 may compute share $E_1^{-1}(E_1(s_{1,1}))$ from encoded share $E_1(s_{1,1})$ and/or computing share $E_2^{-1}(E_2(s_{1,2}))$ from encoded share $E_2(s_{1,2})$. Encoded operation unit 531 may further compute an unencoded at least one computed share $s_{2,1}$ from the at least one shared share 542.2 and shares of the set of input values, and compute the encoded at least one computed share 542.1, e.g., $E_3(s_{2,1})$, from the unencoded at least one computed share, e.g., by applying a respective encoding function $E_3$. For instance, if the at least one shared share 542.2=544.2 is stored encoded, e.g., as $E_4(s_{2,2})$. The at least one shared share $s_{2,2}$ may be computed from an encoded at least one shared share 542.2=544.2, e.g., $s_{2,2}=E_4^{-1}(E_4(s_{2,2}))$.

For instance, if input value 541 and output value 542 are additively shared and operation 531 is denoted f, performing operation 531 may comprise computing $s_{2,1}=E_3(f(E_1^{-1}(E_1(s_{1,1}))+E_2^{-1}(E_2(s_{1,2})))-E_4^{-1}(E_4(s_{2,2}))$ from $E_1(s_{1,1})$, $E_2(s_{1,2})$, and $E_4(s_{2,2})$. This computation may be readily adapted to other types of sharing and/or other amounts of input and output values. The computation may be implemented using various known techniques, e.g., using machine code instructions, look-up tables, etcetera.

Figure 6:
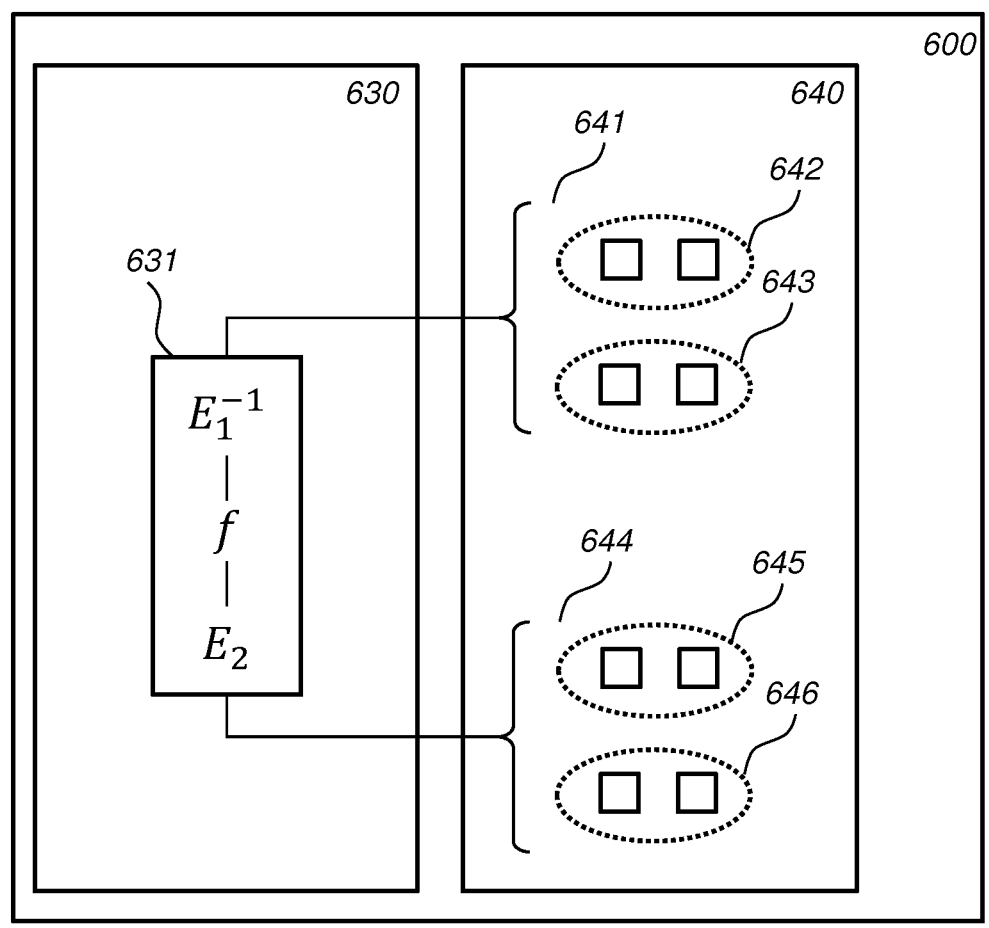

FIG. 6 schematically shows an example of an embodiment of a computation device 600 for performing a computation on at least a set of values, each value being stored as a plurality of shares. Computation device 600 comprises a processor 630 and a memory 640. For example, computation device 600 may be based on computation device 100, 200, 300, 300', and/or 400. Similarly to FIG. 5, shares of the plurality of shares stored in memory 640 may be stored encoded. In particular, in computation device 600, multiple values of the set of values may make up a combined value that is stored encoded. By way of example, the figure shows two values 642, 643 that make up a combined value 641 and two value 645, 646 that make up a combined value 644. Generally, any number of values may make up a combined value. For instance, a combined value may make up a number of bits, e.g., 8 or 16 bits, the combined vale being the concatenation of the bits. Similarly, values may be k-ary, the respective values making up the combined value as a k-ary representation.

Any appropriate encoding of the combined value may be used, e.g., the value encoded by set of values 641 may be $E_1^{-1}(z_1|z_2)$ where $z_1$ is value 642, $z_2$ is value 643, | denotes concatenation, and $E_1$ is an encoding function. Similarly, the value encoded by set of values 644 may be $E_2^{-1}(z_3|z_4)$ where $z_3$ is value 645, $z_4$ is value 646, and $E_2$ is an encoding function. Encoding function $E_2$ may be the same or different from encoding function $E_1$, and it is also possible that only set of values 641 or only set of values 644 is stored encoded.

Computation device 600 may comprise an encoded function unit 631 configured to performing an operation with input and/or output values that make up a combined value that is stored encoded. To this end, encoded function unit 631 may apply an inverse encoding function on a combined value comprising multiple input values to obtain an unencoded combined value, e.g., compute $E_1^{-1}(z_1|z_2)$, and/or apply an encoding function on a combined value comprising multiple output values to obtain an encoded combined output value, e.g., computing $E_2(f(E_1^{-1}(z_1|z_2))$, where f is the operation to be performed and output values $z_3$ and $z_4$ are defined by encoded combined output value $E_2$ $(f(E_1^{-1}(z_1|z_2))$. For instance, the computation of $E_2(f(E_1^{-1}(z_1|z_2))$ may comprise multiple operations that can be performed using the various techniques described herein, e.g., as described for operation units 131 or 231.

For instance, the function for performing the operation on encoded values, e.g., $F=E_2 \circ f \circ E_1^{-1}$, may be written as a set of Lagrange interpolating polynomials, such an interpolating polynomial giving the value of an output value of set of output values 644. Encoded function unit 631 may then evaluate the interpolating polynomial as a circuit, e.g., a binary circuit. These interpolating polynomials may differ only in coefficients used. In particular, the shape of such a circuit may be independent of operation f and/or different output values may have similarly-shaped circuits. This may make the use of interpolating polynomials particularly suitable in combination with parallel computation branches as described herein, with several branches executing similar circuits. Moreover, having similarly-shaped circuits for different operations may make the operation harder to recognize in the overall computation.

More generally, the use of encodings complicates attacks since it becomes harder to read values of the computation from memory. Moreover, since operation f on encodings can be phrased in terms of operations that can be performed using the techniques herein, encodings may in effect be implemented as a layer on top of the share computation techniques described herein, thereby inheriting and further improving their protection against share reduction attacks, share localization attacks, and the like.

Figure 7A:
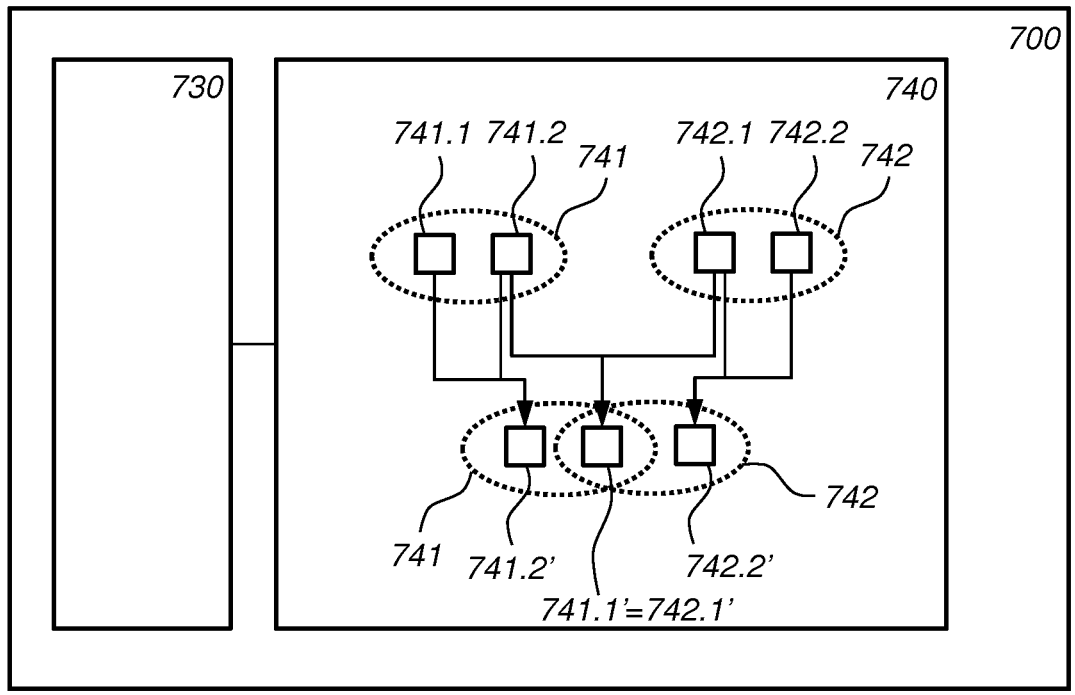

FIG. 7a schematically shows an example of an embodiment of a computation device 700. Computation device 700 comprises a memory 740 configured to store a set of values, each value of the set of values being stored as a plurality of shares. For example, shown in the figure are a value $z_I^1$, 741 stored as shares $s_{z_I^1,0}$, 741.1 and $s_{z_I^1,1}$, 741.2 and a value $z_I^2$, 742 stored as shares $s_{z_I^2,0}$, 742.1 and $s_{z_I^2,1}$, 2742.2, e.g., using XOR-sharing. Computation device 700 is for performing a computation on at least the set of values, e.g., processor 730 of computation device 700 performs the computation. For example, computation device 700 may be based on computation device 100, 200, 300, 300', 400, 500, or 600.

Computation device 700 may comprise a re-sharing unit 731 configured to re-share a first value, e.g., value 741, and a second value, e.g., value 742. For example, value 741 may be an output of an operation of the computation performed by computation device 700 according to embodiments described herein. E.g., value 741 may be output value 143 computed by operation unit 131, output value 245 or 246 of operation unit 231, and the like. For instance, share 741.1 may be a computed share as computed as part of the operation and/or share 741.2 may be a shared share that defines output value 741 as well as a further value before the resharing. Similarly, value 742 may be an output of an operation performed by computation device 700, e.g., share 741.1 is a computed share and/or share 742.2 is a shared share. The re-sharing may involve more than two values.

As a result of the re-sharing, at least one new shared share, e.g., share $r^I$, 741.1'=742.1', may define both value 741 and value 742. Similarly, at least one further new share, e.g., share $z_I^1$, 741.2', may define first value 741 but not second value 742, and/or at least one further new share, e.g., share $z_I^2$, 742.2', may define second value 742 but not first value 741. For example, values 741 and 742 may be respective input values of an operation and a further operation according to embodiments described herein, e.g., first value 741 may be input value 241 or 243 and second value 742 may be further input value 242 or 244 of computation device 200. If additional values are re-shared, a single shared share may define each of the values being re-shared. Different subsets of the set of values may also have different common shared shares.

Hence, the re-sharing may enable applying an operation and a further operation on an input value and a further input value that were not defined at least in party by a common share before the re-sharing. In an embodiment, re-sharing as described here may be applied to outputs of computations 451 and/or 456 to be used as input to respective computations 452 and 457, such that operations of computations 452 and 457 and possibly subsequent computations can be performed on respective pairs of values defined by at least one shared share.

In order to re-share first value 741 and second value 742, re-sharing unit 731 may compute at least one new shared share 741.1'=742.1' defining both first value 741 and second value 742 based on previous shares defining the first value and previous shares defining the second value, e.g., one or more of shares 741.1, 741.2, 742.1, and 742.2. Preferably, at least one share of the first value and at least one share of the second value are used such that the shared share, and thereby also shares computed from it, depends at least on both input values. For instance, the shared share $r_j$ may comprise a sum, e.g., a XOR, of shares of respective input values. For example, $r_j = s_{z_j^1,1}$ xor $s_{z_j^2,1}$. Computed shares of the respective values may then be computed based on the shared shares and previous shares defining the respective values.

For example, re-sharing unit 731 may compute at least one further new share $z_j^1$, 741. 2' defining first value 741 from the at least one new shared share $r_j$, 741.1'=742.1' and previous shares $s_{z_j^1,0}$, 741.1, $s_{z_j^1,1}$, 741.2, defining the first value. For example, this computation may compute a value equal to the difference between the first value and the at least one shared share, e.g., $z_j^2 = s_{z_j^1,0}$ xor $s_{z_j^1,1}$. Interestingly, this computation typically does not comprise computing the first value itself, e.g., the first value does not occur as an intermediate result of the computation.

Similarly, re-sharing unit 731 may compute at least one further new share $z_j^2$, 742.2' defining second value 742 from the at least one new shared share $r_j$, 741.1'=742.1' and previous shares $s_{z_j^2,0}$, 742.1, $s_{z_j^2,1}$, 742.2, defining the second value. For example, this computation may compute a value equal to the difference between the second value and the at least one shared share, e.g., $z_j^2 = s_{z_j^2,0}$ xor $s_{z_j^2,1}$. As above, interestingly, this computation typically does not comprise computing the second value itself.

Figure 7B:
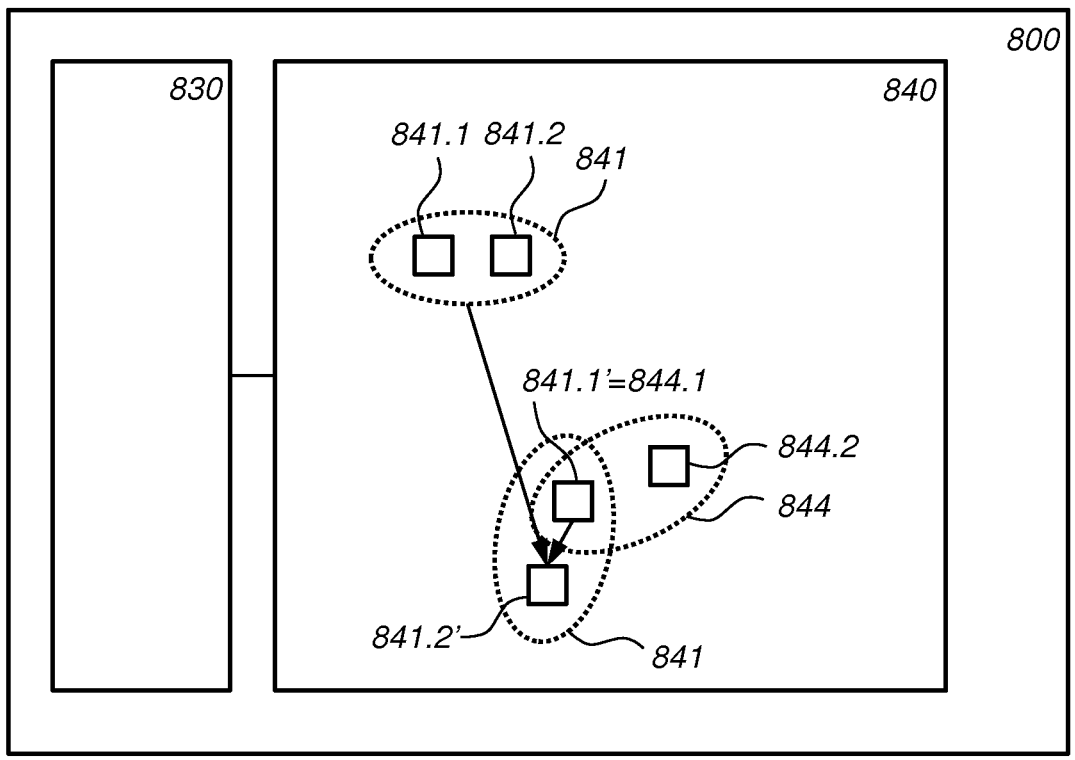

FIG. 7b schematically shows an example of an embodiment of a computation device 800. Computation device 800 comprises a memory 840 configured to store a set of values, each value of the set of values being stored as a plurality of shares.

For example, shown in the figure is a value $z_l$, 841 stored as shared $s_{z_l,0}$, 841.1 and $s_{z_l,1}$, 841.2, e.g., $z_l = s_{z_l,0}$ xor $s_{z_l,i}$. Computation device 800 is for performing a computation on at least the set of values. For example, computation device 800 may be based on computation device 100, 200, 300, 300', 400, 500, 600, or 700.

Computation device 800 may comprise a re-sharing unit 831 configured to re-share a value, e.g., value 841. For example, value 841 may be an output of an operation of the computation performed by computation device 800 according to embodiments described herein. E.g., value 841 may be output value 143 of operation unit 131 or any other output value. Preferably though, value 841 is an output value of an operation that has been performed together with a further operation to obtain a further value with which the output value shares a share as described herein, e.g., output value 245 or 246 of operation unit 231. For instance, share 841.1 may be shared between the operation and the further operation of operation unit 231 and share 841.2 may be computed from share 841.1, or the other way around.

As a result of the re-sharing, value 841 may be defined after the re-sharing by at least one shared share $s_{r,b}$, 841.1'=844.1 and at least one computed share $w_l$, 841.2'. The at least one shared share may also define a further value 844 that is an output of an operation of the computation performed before the re-sharing, e.g. further value 844 may be defined by shares 841.1'=844.1 and 844.2. Further value 844 may be chosen similarly to further value 144 of computation device 100, e.g. randomly among a set of outputs of previously performed operations.

Hence, the re-sharing may lead to value 841 being defined by a shared share that also defines a value, e.g., value 844, that is generally unrelated to value 841 itself. For instance, value 844 does not need to be a value of a respective further computation, e.g., of another parallel computation branch, as in computation device 400. As a consequence, the re-sharing further complicates analysis of the program flow by an attacker. After the re-sharing, value 841 may be an input of an operation of computation device 800, e.g., value 841 may be value 141, 142, of an operation unit 131 of computation device 800, etc.

In order to re-share value 841, re-sharing unit 831 may compute the at least one computed share 841.2' from the at least one shared share 841.1'=844.1 and shares 841.1, 841.2 defining the value before the re-sharing. For instance, the at least one computed share may be computed such that it reconstructs together with the at least one shared share to the value, preferably without computing the value as an intermediate result. For instance, if value 841 is additively shared, the computation may comprise determining the negative of shared share 841.1'=844.1 and adding subsequent shares of the value before the re-sharing, e.g., share 841.1 and 841.2. If the value is XOR-shared, the computation may similarly comprise adding subsequent shares of the value before the re-sharing, e.g., share 841.1 and 841.2, to shared share 841.1'=844.1. For instance, computed share 841.2 may be computed as $w_l = (s_{r,b}$ xor $s_{z_l,0})$ xor $s_{z_l,1}$, and the like. Interestingly, this computation typically does not comprise computing the value itself, making it harder for an attacker to obtain the value.

Various aspects of the foregoing are now elaborated upon in a detailed example of an embodiment for computing the AES encryption function as a boolean circuit comprising AND and XOR gates.

Step 1. Randomness Creation

For i=0 . . . 15, pick a random non-linear bijective functions $S_i$: $\{0,1\}^8 \to \{0,1\}^8$ and a random invertible linear function L: $\{0,1\}^{128} \to \{0,1\}^{128}$. For any 128 bit value x, let $x^b$ denote its b-th byte and let $x_i$ denote its i-th bits as follows:

$$x = x^0 \ldots x^{15} = x_0 \ldots x_{127}.$$

Define the function S: $\{0,1\}^{128} \to \{0,1\}^{128}$ by $$S(x) = S_0(x^0) \ldots S_{15}(x^{15}).$$

An arithmetic boolean circuit $C_0, \ldots, C_n$ may be created that on input x computes y=S(L(S(L(x)))), e.g., the computation may be by initial obfuscation computation unit 336. Let $z_L$ denote the output of gate $C_L$.

Step 2. Share Introduction

Suppose that the values $z_1, \ldots, z_n$ corresponds to values after the call to function S. Let $\mathcal{S} = \emptyset$ be the initial collection of shares. Then the next 128 operations $C_{n+1}, \ldots, C_{n+128}$ may be used to introduce shares of y:

$$z_{n+1+i} = C_{n+1+i}(y_i) = y_i \text{ xor } z_{r_i},$$

for i=0, . . . , 127 and where $r_i \in_R [t, n]$. Insert the pair $s_{n+1+i} := (S_{n+1+i,0}) := (z_{n+1+i}, z_{r_i})$ into $\mathcal{S}$.

Step 3. Shared Input/Inverse of the Initial Obfuscation Operation

A boolean arithmetic circuit $C'_0, \ldots, C'_n$, may be created that on input y computes $x = L^{-1}(S^{-1}(L^{-1}(S^{-1}(y))))$, e.g., performed by inverse obfuscation computation unit 337. Each operation, e.g., gate, of the boolean arithmetic circuit, on shares may be performed as follows, e.g., by operation unit 131.

AND gates ($z_j = z_k$ and $z_\ell$) may be performed as:

(a) $c_0 = s_{k,1}$ and $s_{\ell,1}$,
(b) $c_1 = s_{k,0}$ and $s_{\ell,1}$,
(c) $c_2 = s_{k,1}$ and $s_{\ell,0}$, (d) $c_3 = S_{k,0}$ and $s_{\ell,0}$,
(e) $c_4 = c_0$ xor $s_{r,b}$ (for a random index $r \in [n+1, n+1+|\mathcal{S}|]$ of a further value output by a previously performed operation of the computation, and share $b \in [0,1]$ thereof).
(f) $c_5 = c_4$ xor $c_1$,
(g) $c_6 = c_5$ xor $c_2$,
(h) $z_j = c_6$ xor $c_3$, and $(s_{j,0}, s_{j,1}) = (z_j, s_{r,b})$ comprising computed share $z_j$ and shared share $s_{r,b}$ is added to $\mathcal{S}$.

XOR gates ($z_1 = z_k$ xor $z_\ell$) may be performed as:
(a) $c_0 = s_{k,1}$ xor $s_{\ell,1}$,
(b) $c_1 = c_0$ xor $s_{r,b}$ (for a random index $r \in [n+1, n+1+|\mathcal{S}|]$ of a further value output by a previously performed operation of the computation, and share $b \in [0,1]$ thereof).
(c) $c_2 = c_1$ xor $s_{k,0}$,
(d) $z_1 = c_2$ xor $s_{\ell,0}$, and $s_j = (s_{j,0}, s_{j,1}) := (z_j, s_{r,b})$ comprising computed share $z_j$ and shared share $s_{r,b}$ is added to S.

Step 4. Introduce Two Asynchronous Parallel Computation Branches

Two boolean Circuits $\mathcal{C}_1$ and $\mathcal{C}_2$ on shares may be created and evaluated as in the previous step, where $\mathcal{C}_1$, e.g., performed by obfuscation computation unit 451, computes two inverse rounds of AES on dummy keys $K_{d1}$ and $K_{d2}$, and $\mathcal{C}_2$, e.g., computed by dummy computation unit 456, computes respectively an inverse AES round followed by an forward AES round on the same dummy key $K_d$.

Step 5. Share Reorganization/Re-Sharing

Let $[Z^1] = s_{z_0^1} \ldots s_{z_{127}^1}$ denote the shared results of $\mathcal{C}_1$ and $[Z^2] = s_{z_0^2} \ldots s_{z_{127}^2}$ denote the shared results of $\mathcal{C}_2$. The following boolean circuit for $\ell = 0, \ldots, 127$ may be created to reorganize shares of $Z^1$ and $Z^2$, e.g., performed by re-sharing unit 731:

$z_\ell^1 = s_{z_\ell^1, 0}$ xor $s_{z_\ell^2, 1}$, $r^\ell = s_{z_\ell^1, 1}$ xor $s_{z_\ell^2, 1}$, $z_\ell^2 = s_{z_\ell^2, 0}$ xor $s_{z_\ell^1, 1}$.

Hence, after the re-sharing, the first value and second value may be both defined by shared share $r^\ell$, the first value being further defined by further new share $z_\ell^1$ and the second value being further defined by further new share $z_\ell^2$.

Let $N = |\mathcal{S}|$. Add the triple $s_{N+\ell} := (s_{N+\ell, 0}, s_{N+\ell, 1}, s_{N+\ell,}) := (z_\ell^1, r_\ell, z_\ell^2)$ to $\mathcal{S}$.

Step 6. Parallel AES Rounds

A boolean circuit $\mathcal{C}$ may be created that runs 14 forward AES rounds. AND and XOR gate may be transformed to operate on two parallel shared tracks, e.g., computed by parallel computation branch units 431 and 432, as follows. Operations of the respective parallel shared tracks may be performed, e.g., by operation unit 231, as detailed below.

An AND gate ($z_j = z_k$ and $z_\ell$) may be transformed to:
(a) $c_0 = r_k$ and $r_\ell$,
(b) $r_j = c_0$ xor s, for a random bit, e.g., a share of an output of a previously-performed operation, in $\mathcal{S}$.
(c) $c_0 = r_k$ and $z_\ell^1$,
(d) $c_1 = r_\ell$ and $z_k^1$,
(e) $c_2 = z_k^1$ and $z_\ell^1$,
(f) $c_3 = r_j$ xor $c_1$,
(g) $z_j^1 = c_3$ xor $c_2$.
(h) $c_0 = r_k$ and $z_\ell^2$,
(i) $c_1 = r_\ell$ and $z_k^2$,
(j) $c_2 = z_k^2$ and $z_\ell^2$,
(k) $c_3 = r_j$ xor $c_1$,
(l) $z_j^2 = c_3$ xor $c_2$.

A XOR gate unrelated to key addition ($z_j = z_k$ xor $z_\ell$) may be transformed to:
(a) $r_j = r_k$ $r_\ell$.
(b) $z_j^1 = z_k^1$ xor $z_\ell^1$.
(c) $z_j^2 = z_k^2$ xor $z_\ell^2$.

A XOR gate related to key addition ($z_j = z_k$ xor K) may be transformed to:
(a) $z_j^1 = z_k^1$ xor $K^1$.
(b) $z_j^2 = z_k^2$ xor $K^2$.

wherein shared share $r_j$ shared between the output value and further output value is shared share $r_k$ shared between the input value and further input value. Alternatively, key $K^1$ and/or $K^2$ may be stored as shares and the procedure for XOR gates unrelated to key addition may be used. This may increase uniformity of the circuit, making it harder to recognize XOR gates using keys as constants.

Add the triple $s_j := (s_{j,0}, s_{j,1}, s_{j,2}) := (z_j^1, r_j, z_j^2)$ to $\mathcal{S}$. Here, share $z_j^1$ may correspond to computed share 245.2; share $r_j$ may correspond to shared share 245.1=246.1; and share $z_j^2$ may correspond to computed share 246.2.

The sequence of keys operating on $Z^1$ may be $K_{d2}, K_{d1}$, e.g., used by inverse obfuscation computation unit 452; $K_0, \ldots, K_{10}$, e.g., used by functional computation unit 453; and $K_{d3}, K_{d4}$, e.g., used by obfuscation computation unit 454.

With respect to $Z^2$ the sequence may be $K_0, \ldots, K_{10}$, e.g., used by functional computation unit 457; $K_{d3}, K_{d4}$, e.g., used by obfuscation computation unit 454; and $K_{d5} K_{d6}$, e.g., used by obfuscation computation unit 459.

Dummy keys $K_{d3}, K_{d4}, K_{d5}, K_{d6}$, may be randomly generated.

Step 7. Reorganizing Shares/Re-Sharing

Let $[Z] = s_{z_0} \ldots s_{z_{127}}$, denote the shared combined results of $\mathcal{C}$. Let $[W^1]$ denote the shared result of the first track (e.g., $\mathcal{C}$ executed on input $Z^1$) and $[W^2]$ denote the shared result of the second track (e.g., $\mathcal{C}$ executed on input $[Z^2]$).

The following boolean circuit for $i = 0, \ldots, 127$ may be created to reorganize shares of Z, e.g., corresponding to two re-sharings by re-sharing unit 831 of computation device 800:

$c_0 = s_{z_\ell 0}$ xor $s_{r1, b1}$ $w_\ell^1 = c_0$ xor $s_{z_\ell 1}$ $c_0 = s_{z_\ell 2}$ xor $s_{r2, b2}$ $w_\ell^2 = c_0$ xor $s_{z_\ell 1}$, for a random r1, r2 $\in [n+1, n+1+|\mathcal{S}|]$ and b1, b2 $\in [0,1]$.

For instance, shares $s_{z_\ell 0}$, $s_{z_\ell 1}$ before the re-sharing may correspond to shares 841.1, 841.2 and shares $s_{r1, b1}$, $w_\ell^1$ we after the re-sharing may correspond to shares 841.1'=844.1 and 841.2', respectively, and similarly for $s_{z_\ell 1}$, $s_{z_\ell 2}$, $s_{r2, b2}$, and $w_\ell^2$.

Let $N = |\mathcal{S}|$. Add $s_{N+2*\ell} := (s_{N+2*\ell, 0}, s_{N+2*\ell, 1}) := (z_\ell^1, s_{r1, b1})$ and $s_{N+2*\ell+1} := (s_{N+2*\ell+1, 0}, s_{N+2*\ell+1, 1}) := (z_\ell^2, s_{r2, b2})$ to $\mathcal{S}$.

Step 8. Synchronize Tracks

Two boolean Circuits $\mathcal{C'}_1$ and $\mathcal{C'}_2$ may be evaluated on shares as in Step 3, where $\mathcal{C'}_1$ computes one inverse round of AES and one forward round on a dummy key $K_d$, e.g., performed by dummy computation unit 455, and $\mathcal{C'}_2$ computes respectively two inverse AES rounds using the dummy keys respectively $K_{d6}$ and $K_{d5}$, e.g., performed by inverse obfuscation computation unit 460.

Step 9. Combine Tracks

Let $W'_1$ denote the result of $C'_1$ on input $W^1$ and $W'_2$ denote the result of $C'_2$ on input $W^2$. An invertible linear function $L': \{0,1\}^{128} \to \{0,1\}^{128}$ may be generated that satisfies that the map $L2(x)=(L'+I)(x)=L'(x)+x$ is also invertible. A boolean circuit may be created that computes $Z'=L'(W'_1)+L2(W'_2)$, e.g., is computed by averaging computation unit 435 on shares as in Step 3.

Step 10. Undo Sharing

Let $[Z']=s_{z'_0}, \ldots s_{z'_{127}}$ denote the result of previous step. The sharing may be undone, e.g., the values may be reconstructed, as follows: for $i=0, \ldots, 127$ $z'_i = s_{z'_i,0}$ xor $s_{z'_i,1}$.

Step 11. Rewind to Output

A boolean circuit may be created that computes two inverse AES rounds on dummy keys $K_{d4}$, and $K_{d3}$ respectively, e.g., performed by inverse obfuscation computation unit 461, e.g., to obtain the computation output.

The execution of the computation devices described herein is implemented in a processor, examples of which are shown herein. FIG. 1-7*b* show functional units that may be functional units of the processor. For example, FIG. 1 may be used as a blueprint of a possible functional organization of the processor. For example, the functional units shown in FIG. 4 may be wholly or partially be implemented in computer instructions that are stored at device 400, e.g., in an electronic memory of device 400, and are executable by a microprocessor of device 400, and similarly for the other computation devices. In hybrid embodiments, functional units are implemented partially in hardware, e.g., as coprocessors, e.g., crypto coprocessors, and partially in software stored and executed on the respective devices.

A computation device 100, 200, 300, 300', 400, 500, 600, 700 or 800 may have a user interface, which may include well-known elements such as one or more buttons, a keyboard, display, touch screen, etc. The user interface may be arranged for accommodating user interaction for initiating a computation on at least a set of values.

Typically, the computation devices each comprise a microprocessor (not separately shown) which executes appropriate software stored at the respective device; for example, that software may have been downloaded and/or stored in a corresponding memory, e.g., a volatile memory such as RAM or a non-volatile memory such as Flash (not separately shown). Alternatively, the computation devices may, in whole or in part, be implemented in programmable logic, e.g., as field-programmable gate array (FPGA). The computation devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

In an embodiment, computation device 100 comprises an operation circuit 131. The device 100 may comprise additional circuits, e.g., an obfuscation computation circuit, an averaging computation circuit, etcetera. Similarly, computation device 200 may comprise an operation circuit 231, computation device may comprise parallel computation branch circuits 331, 332, an operation circuit 333, etcetera. Computation device 400 may comprise an operation circuit 433, etcetera. Computation device 500 may comprise an encoded operation circuit 531, etcetera. Computation device 600 may comprise an encoded function circuit 631, etcetera. Computation device 700 may comprise a re-sharing circuit 731, etcetera. Computation device 800 may comprise a re-sharing circuit 831, etcetera. The circuits implement the corresponding operations and/or computations described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. The circuits may also be, FPGA, ASIC or the like. The system may comprise additional circuits, e.g., a first parallel computation branch circuit, etc.; the circuits implementing the corresponding operations and/or computations described herein.

FIG. 8*a* schematically shows an example of an embodiment of a computation method 900 for performing a computation on at least a set of values. Computation method 900 may comprise providing 910 a set of values, each value of the set of values being stored as a plurality of shares. Computation method 900 may further comprise performing 920 an operation of the computation on a set of input values to obtain an output value. The output value may be defined by at least one shared share and at least one computed share. The at least one shared share may also define a further value. Performing 920 the operation may comprise computing 921 the at least one computed share from the at least one shared share and shares of the set of input values.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 910 and 920 may be executed, at least partially, in parallel. Moreover, a given step may not have finished completely before a next step is started.

A method according to the invention may be executed using software, which comprises instructions for causing a processor system to perform method 900. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

FIG. 8b shows a computer readable medium 1000 having a writable part 1010 comprising a computer program 1020, the computer program 1020 comprising instructions for causing a processor system to perform a computation method for performing a computation on at least a set of values, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said computation method.

FIG. 8c shows in a schematic representation of a processor system 1140 according to an embodiment. The processor system comprises one or more integrated circuits 1110. The architecture of the one or more integrated circuits 1110 is schematically shown in FIG. 8c. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the computation device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software. The software comprises operation instructions arranged to perform an operation of the computation on a set of input values according to an embodiment.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A cryptographic computation device comprising: a memory circuit, wherein the memory circuit is configured to store a set of sensitive values, wherein each value of the set of values is stored as a plurality of shares to prevent disclosure of each value, wherein some or all of the plurality of shares define at least one first value from the set of values; a processor circuit, wherein the processor circuit is configured to perform a first operation of a computation on the asset of input values of the set of values to obtain an output value that is stored as a plurality of shares to prevent disclosure of the output value, wherein, the output value is defined by at least one shared share and at least one computed share, wherein the at least one shared share defines is a share of the plurality of shares of at least a second value, different from the output value, and wherein performing the first operation comprises computing the at least one computed share based at least on the at least one shared share and the plurality of shares.

2. The computation device as in claim 1, wherein the computation comprises an evaluation of a block cipher on a message.

3. The computation device as in The computation device as in wherein computing the at least one computed share comprises computing a sequence of multiple intermediate results, wherein each some or all of the intermediate results are is-computed from the at least one shared share.

4. The computation device as in claim 1, wherein the second value is independent of the output value from the set of values.

5. The computation device as in claim 1, wherein each share which that defines the output value is a share of the plurality of shares of at least another value of the set of values also defines a respective second value.

6. The computation device as in claim 1, wherein the second value is an output of a third another operation.

7. The computation device as in The computation device as in wherein the computation comprises a second operation on a second set of values to obtain the second value, wherein the second value is defined by the at least one shared share and at least one second computed share, wherein the processor circuit is configured to compute the at least one computed share from the at least one shared share and the plurality of shares, wherein the processor circuit is configured to compute the at least one second computed share from the at least one shared share and shares of the second set of values.

8. The computation device as in claim 7, wherein the processor circuit is configured to compute the at least one shared share using at least one share of an output of a third performed operation as a random value.

9. The computation device as in The computation device as in wherein the computation comprises at least a first and a second parallel computation branch, wherein each computation branch computes a copy of the same output value, thus creating multiple copies of the output value, wherein each computation branch computes an averaging computation to combine the multiple copies into a single output value, wherein different parallel computation branches comprise the first operation and the second operation.

10. The computation device as in claim 1, wherein the computation comprises an initial obfuscation computation, followed by an inverse of the initial obfuscation computation.

11. The computation device as in The computation device as in wherein the values are bits, wherein the computation comprises a binary operation.

12. The computation device as in claim 1, wherein the a second operation using the output value as an input are interleaved.

13. The computation device as in claim 1, wherein a at least one share of the plurality of shares is stored encoded.

14. The computation device as in The computation device as in wherein a portion of the values of the set of values make up a combined value, wherein the combined value is stored encoded.

15. A cryptographic computation device comprising: a memory circuit, wherein the memory circuit is configured to store a set of sensitive values, wherein each value of the set of values is stored as a plurality of shares to prevent disclosure of the value; and a processor circuit, wherein the processor circuit is configured to re-share a first value and a second value of the set of values, wherein the re-sharing comprising comprises: computing at least one first shared share, wherein the first shared share defines both is a share of the plurality of shares of the first value and a share of the plurality of shares of the second value, wherein the first value is based on one or more third shares, defining the first value and wherein the second value is based on one or more fourth shares defining the second value; computing at least one second share defining that is included in the plurality of shares of the first value from the at least one first shared share and the one or more third shares; computing at least one fifth share defining that is included in the plurality of shares of the second value from the at least one first shared share and the one or more fourth shares.

16. A cryptographic computation method comprising: providing a set of values, wherein each value of the set of values is stored as a plurality of shares to prevent disclosure of each value; performing a first operation of a computation on a set of values to obtain an output value, wherein the output value is defined by at least one shared share and at least one computed share to prevent disclosure of the output value, wherein the at least one shared share is also defines included in the plurality of shares of a second value, wherein performing the first operation comprises computing the at least one computed share from the at least one shared share and at least one share of the plurality of shares.

17. A computer program stored on a non-transitory medium, wherein the computer program when executed on a processor performs the method as claimed in claim 16.

18. The method as in The method as in wherein computing the at least one computed share comprises computing a sequence of multiple intermediate results, wherein each at least one intermediate result is computed from the at least one shared share.

19. The computation device as in claim 16, wherein the computation comprises at least a first and a second parallel computation branch, wherein each computation branch computes a copy of the same output value thus creating multiple copies, wherein each computation branch computes an averaging computation to combine the multiple copies into a single output value, wherein different parallel computation branches comprise the first operation and the second operation.

* * * * *